(12) United States Patent
Saito

(10) Patent No.: US 7,471,401 B2
(45) Date of Patent: Dec. 30, 2008

(54) INFORMATION PROCESSING APPARATUS, PRINTING PROCESSING METHOD, AND PROGRAM THEREFOR

(75) Inventor: Kazuyuki Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 916 days.

(21) Appl. No.: 10/421,790

(22) Filed: Apr. 24, 2003

(65) Prior Publication Data

US 2003/0202213 A1 Oct. 30, 2003

(30) Foreign Application Priority Data

Apr. 26, 2002 (JP) .............................. 2002-127283
Apr. 11, 2003 (JP) .............................. 2003-107987

(51) Int. Cl.
*G06F 15/00* (2006.01)

(52) U.S. Cl. .................... 358/1.13; 358/1.18; 358/3.28; 382/282; 382/284; 382/306; 715/230; 380/55; 283/113

(58) Field of Classification Search ................ 358/1.13, 358/1.18, 3.28; 715/230; 380/55; 283/113; 382/282, 284, 306
See application file for complete search history.

(56) References Cited

U.S. PATENT DOCUMENTS

| 5,718,520 | A | * | 2/1998 | MacKay ....................... 400/61 |
| 5,983,243 | A | * | 11/1999 | Heiney et al. ............... 715/500 |
| 7,027,179 | B2 | * | 4/2006 | Mori ........................ 358/1.18 |
| 7,239,418 | B2 | | 7/2007 | Mori | |
| 2002/0018233 | A1 | | 2/2002 | Mori | |
| 2002/0101599 | A1 | | 8/2002 | Okimoto et al. ............ 358/1.13 |
| 2002/0114007 | A1 | * | 8/2002 | Hayashi ..................... 358/1.18 |
| 2002/0176101 | A1 | * | 11/2002 | Tsunekawa ................. 358/1.9 |
| 2003/0090713 | A1 | | 5/2003 | Saito ........................ 358/1.15 |
| 2003/0189726 | A1 | * | 10/2003 | Kloosterman et al. ...... 358/1.18 |
| 2006/0158688 | A1 | | 7/2006 | Mori | |
| 2007/0247667 | A1 | | 10/2007 | Mori | |

FOREIGN PATENT DOCUMENTS

| JP | 2-135524 | 5/1990 |
| JP | 8-063310 | 3/1996 |
| JP | 8-202863 | 8/1996 |
| JP | 11-143668 | 5/1999 |
| JP | 2001-328325 | 11/2001 |

* cited by examiner

*Primary Examiner*—David K More
*Assistant Examiner*—Mark R Milia
(74) *Attorney, Agent, or Firm*—Fitzpatrick, Cella, Harper & Scinto

(57) ABSTRACT

The present invention aims that in a printing environment holding only a print instruction and a print data, a printing system capable of updating, changing, correcting, etc. only an additional drawing object is provided by holding an instruction about printing of an additional drawing object (added information) based on the print instruction. In printing out print data on a target page with an additional drawing object added, a job ticket generation means generates a job ticket according to the information about an additional drawing object and instruction information about the printout. Printout means perform printout based on the job ticket generated by the job ticket generating means.

9 Claims, 22 Drawing Sheets

FIG. 7

```
〈DESIGNATION UNIT〉
    〈ENTIRE DESIGNATION〉
        〈GROUP DESIGNATION  GROUP NAME = "bugaihi-1"  PRINT FLAG = "True"〉
            〈OBJECT LINK INFORMATION  LINK = "bugaihi.pdf"/〉
        〈/GROUP DESIGNATION〉
        〈GROUP DESIGNATION  GROUP NAME = "bugaihi-2"  PRINT FLAG = "False"〉
            〈OBJECT LINK INFORMATION  LINK = "confidential.pdf"/〉
        〈/GROUP DESIGNATION〉
    〈/ENTIRE DESIGNATION〉

〈LAYOUT RELATED DESIGNATION〉
        〈CHAPTER UNIT DESIGNATION〉
            〈SHEET UNIT DESIGNATION〉
                〈PAGE UNIT DESIGNATION  FRONT/BACK = "FRONT"〉
                    〈CONTENTS INFORMATION  LOGICAL PAGE NUMBER = "1"/〉
                    〈ADDITIONAL OBJECT DESIGNATION  GROUP NAME = "bugaihi-1"/〉
                〈/PAGE UNIT DESIGNATION〉
            〈/SHEET UNIT DESIGNATION〉
            〈SHEET UNIT DESIGNATION〉
                〈PAGE UNIT DESIGNATION  FRONT/BACK = "FRONT"〉
                    〈CONTENTS INFORMATION  LOGICAL PAGE NUMBER = "2"/〉
                    〈ADDITIONAL OBJECT DESIGNATION  GROUP NAME = "bugaihi-1"/〉
                〈/PAGE UNIT DESIGNATION〉
            〈/SHEET UNIT DESIGNATION〉
            〈SHEET UNIT DESIGNATION〉
                〈PAGE UNIT DESIGNATION  FRONT/BACK = "FRONT"〉
                    〈CONTENTS INFORMATION  LOGICAL PAGE NUMBER = "3"/〉
                    〈ADDITIONAL OBJECT DESIGNATION  GROUP NAME = "bugaihi-1"/〉
                〈/PAGE UNIT DESIGNATION〉
            〈/SHEET UNIT DESIGNATION〉
        〈/CHAPTER UNIT DESIGNATION〉
        〈CHAPTER UNIT DESIGNATION〉
            〈SHEET UNIT DESIGNATION〉
                〈PAGE UNIT DESIGNATION  FRONT/BACK = "FRONT"〉
                    〈CONTENTS INFORMATION  LOGICAL PAGE NUMBER = "4"/〉
                    〈ADDITIONAL OBJECT DESIGNATION  GROUP NAME = "bugaihi-2"/〉
                〈/PAGE UNIT DESIGNATION〉
                〈PAGE UNIT DESIGNATION  FRONT/BACK = "BACK"〉
                    〈CONTENTS INFORMATION  LOGICAL PAGE NUMBER = "5"/〉
                    〈ADDITIONAL OBJECT DESIGNATION  GROUP NAME = "bugaihi-2"/〉
                〈/PAGE UNIT DESIGNATION〉
            〈/SHEET UNIT DESIGNATION〉
            〈SHEET UNIT DESIGNATION〉
                〈PAGE UNIT DESIGNATION  FRONT/BACK = "FRONT"〉
                    〈CONTENTS INFORMATION  LOGICAL PAGE NUMBER = "6"/〉
                    〈ADDITIONAL OBJECT DESIGNATION  GROUP NAME = "bugaihi-2"/〉
                〈/PAGE UNIT DESIGNATION〉
                〈PAGE UNIT DESIGNATION  FRONT/BACK = "BACK"〉
                    〈CONTENTS INFORMATION  LOGICAL PAGE NUMBER = "7"/〉
                    〈ADDITIONAL OBJECT DESIGNATION  GROUP NAME = "bugaihi-2"/〉
                〈/PAGE UNIT DESIGNATION〉
            〈/SHEET UNIT DESIGNATION〉
        〈/CHAPTER UNIT DESIGNATION〉
    〈/LAYOUT RELATED DESIGNATION〉

〈OUTPUT CONTROL DESIGNATION〉
        〈DETAILED PARAMETER  NUMBER OF PRINT SETS = "100"
            PRINTING RANGE = "1 TO 7"
            STAPLE = "UPPER LEFT"/〉
    〈/OUTPUT CONTROL DESIGNATION〉

〈/DESIGNATION UNIT〉
```

FIG. 8

```
⟨RECORDING UNIT⟩
    ⟨PRINT PARAMETER  PRINTING RANGE = "1 TO 7"  NUMBER OF PRINT SETS = "100"  SPOOL = "UPPER LEFT"⟩
        ⟨PRINT DEVICE INFORMATION  DEVICE NAME = "Printer-A"/⟩
    ⟨/PRINT PARAMETER⟩
⟨/RECORDING UNIT⟩

⟨DESIGNATION UNIT⟩
    ⟨ENTIRE DESIGNATION⟩
        ⟨GROUP DESIGNATION  GROUP NAME = "bugaihi-1"  PRINT FLAG = "True"⟩
            ⟨OBJECT LINK INFORMATION  LINK = "bugaihi.pdf"/⟩
        ⟨/GROUP DESIGNATION⟩
        ⟨GROUP DESIGNATION  GROUP NAME = "bugaihi-2"  PRINT FLAG = "False"⟩
            ⟨OBJECT LINK INFORMATION  LINK = "confidential.pdf"/⟩
        ⟨/GROUP DESIGNATION⟩
    ⟨/ENTIRE DESIGNATION⟩

⟨LAYOUT RELATED DESIGNATION⟩
        ⟨CHAPTER UNIT DESIGNATION⟩
            ⟨SHEET UNIT DESIGNATION⟩
                ⟨PAGE UNIT DESIGNATION  FRONT/BACK = "FRONT"⟩
                    ⟨CONTENTS INFORMATION  LOGICAL PAGE NUMBER = "1"/⟩
                    ⟨ADDITIONAL OBJECT DESIGNATION  GROUP NAME = "bugaihi-1"/⟩
                ⟨/PAGE UNIT DESIGNATION⟩
            ⟨/SHEET UNIT DESIGNATION⟩
            ⟨SHEET UNIT DESIGNATION⟩
                ⟨PAGE UNIT DESIGNATION  FRONT/BACK = "FRONT"⟩
                    ⟨CONTENTS INFORMATION  LOGICAL PAGE NUMBER = "2"/⟩
                    ⟨ADDITIONAL OBJECT DESIGNATION  GROUP NAME = "bugaihi-1"/⟩
                ⟨/PAGE UNIT DESIGNATION⟩
            ⟨/SHEET UNIT DESIGNATION⟩
            ⟨SHEET UNIT DESIGNATION⟩
                ⟨PAGE UNIT DESIGNATION  FRONT/BACK = "FRONT"⟩
                    ⟨CONTENTS INFORMATION  LOGICAL PAGE NUMBER = "3"/⟩
                    ⟨ADDITIONAL OBJECT DESIGNATION  GROUP NAME = "bugaihi-1"/⟩
                ⟨/PAGE UNIT DESIGNATION⟩
            ⟨/SHEET UNIT DESIGNATION⟩
        ⟨/CHAPTER UNIT DESIGNATION⟩
        ⟨CHAPTER UNIT DESIGNATION⟩
            ⟨SHEET UNIT DESIGNATION⟩
                ⟨PAGE UNIT DESIGNATION  FRONT/BACK = "FRONT"⟩
                    ⟨CONTENTS INFORMATION  LOGICAL PAGE NUMBER = "4"/⟩
                    ⟨ADDITIONAL OBJECT DESIGNATION  GROUP NAME = "bugaihi-2"/⟩
                ⟨/PAGE UNIT DESIGNATION⟩
                ⟨PAGE UNIT DESIGNATION  FRONT/BACK = "BACK"⟩
                    ⟨CONTENTS INFORMATION  LOGICAL PAGE NUMBER = "5"/⟩
                    ⟨ADDITIONAL OBJECT DESIGNATION  GROUP NAME = "bugaihi-2"/⟩
                ⟨/PAGE UNIT DESIGNATION⟩
            ⟨/SHEET UNIT DESIGNATION⟩
            ⟨SHEET UNIT DESIGNATION⟩
                ⟨PAGE UNIT DESIGNATION  FRONT/BACK = "FRONT"⟩
                    ⟨CONTENTS INFORMATION  LOGICAL PAGE NUMBER = "6"/⟩
                    ⟨ADDITIONAL OBJECT DESIGNATION  GROUP NAME = "bugaihi-2"/⟩
                ⟨/PAGE UNIT DESIGNATION⟩
                ⟨PAGE UNIT DESIGNATION  FRONT/BACK = "BACK"⟩
                    ⟨CONTENTS INFORMATION  LOGICAL PAGE NUMBER = "7"/⟩
                    ⟨ADDITIONAL OBJECT DESIGNATION  GROUP NAME = "bugaihi-2"/⟩
                ⟨/PAGE UNIT DESIGNATION⟩
            ⟨/SHEET UNIT DESIGNATION⟩
        ⟨/CHAPTER UNIT DESIGNATION⟩
    ⟨/LAYOUT RELATED DESIGNATION⟩

⟨OUTPUT CONTROL DESIGNATION⟩
        ⟨DETAILED PARAMETER  NUMBER OF PRINT SETS = "100"
            PRINTING RANGE = "1 TO 7"
            STAPLE = "UPPER LEFT"/⟩
    ⟨/OUTPUT CONTROL DESIGNATION⟩

⟨/DESIGNATION UNIT⟩
```

FIG. 11

```
(DESIGNATION UNIT)
    (ENTIRE DESIGNATION)
        (GROUP DESIGNATION  GROUP NAME = "bugaihi-1"  PRINT FLAG = "True")
            (OBJECT LINK INFORMATION  LINK = "bugaihi.pdf"/)
        (/GROUP DESIGNATION)
        (GROUP DESIGNATION  GROUP NAME = "bugaihi-2"  PRINT FLAG = "True")
            (OBJECT LINK INFORMATION  LINK = "confidential.pdf"/)
        (/GROUP DESIGNATION)
    (/ENTIRE DESIGNATION)

(LAYOUT RELATED DESIGNATION)
        (CHAPTER UNIT DESIGNATION)
            (SHEET UNIT DESIGNATION)
                (PAGE UNIT DESIGNATION  FRONT/BACK = "FRONT")
                    (CONTENTS INFORMATION  LOGICAL PAGE NUMBER = "1"/)
                    (ADDITIONAL OBJECT DESIGNATION  GROUP NAME = "bugaihi-1"  PRINT FLAG = "True"/)
                (/PAGE UNIT DESIGNATION)
            (/SHEET UNIT DESIGNATION)
            (SHEET UNIT DESIGNATION)
                (PAGE UNIT DESIGNATION  FRONT/BACK = "FRONT")
                    (CONTENTS INFORMATION  LOGICAL PAGE NUMBER = "2"/)
                    (ADDITIONAL OBJECT DESIGNATION  GROUP NAME = "bugaihi-1"  PRINT FLAG = "False"/)
                (/PAGE UNIT DESIGNATION)
            (/SHEET UNIT DESIGNATION)
            (SHEET UNIT DESIGNATION)
                (PAGE UNIT DESIGNATION  FRONT/BACK = "FRONT")
                    (CONTENTS INFORMATION  LOGICAL PAGE NUMBER = "3"/)
                    (ADDITIONAL OBJECT DESIGNATION  GROUP NAME = "bugaihi-1"  PRINT FLAG = "True"/)
                (/PAGE UNIT DESIGNATION)
            (/SHEET UNIT DESIGNATION)
        (/CHAPTER UNIT DESIGNATION)
        (CHAPTER UNIT DESIGNATION)
            (SHEET UNIT DESIGNATION)
                (PAGE UNIT DESIGNATION  FRONT/BACK = "FRONT")
                    (CONTENTS INFORMATION  LOGICAL PAGE NUMBER = "4"/)
                    (CONTENTS INFORMATION  LOGICAL PAGE NUMBER = "5"/)
                    (ADDITIONAL OBJECT DESIGNATION  GROUP NAME = "bugaihi-2"  PRINT FLAG = "True"/)
                (/PAGE UNIT DESIGNATION)
                (PAGE UNIT DESIGNATION  FRONT/BACK = "BACK")
                    (CONTENTS INFORMATION  LOGICAL PAGE NUMBER = "6"/)
                    (CONTENTS INFORMATION  LOGICAL PAGE NUMBER = "7"/)
                    (ADDITIONAL OBJECT DESIGNATION  GROUP NAME = "bugaihi-2"  PRINT FLAG = "False"/)
                (/PAGE UNIT DESIGNATION)
            (/SHEET UNIT DESIGNATION)
            (SHEET UNIT DESIGNATION)
                (PAGE UNIT DESIGNATION  FRONT/BACK = "FRONT")
                    (CONTENTS INFORMATION  LOGICAL PAGE NUMBER = "8"/)
                    (CONTENTS INFORMATION  LOGICAL PAGE NUMBER = "9"/)
                    (ADDITIONAL OBJECT DESIGNATION  GROUP NAME = "bugaihi-2"  PRINT FLAG = "True"/)
                (/PAGE UNIT DESIGNATION)
                (PAGE UNIT DESIGNATION  FRONT/BACK = "BACK")
                    (CONTENTS INFORMATION  LOGICAL PAGE NUMBER = "10"/)
                    (CONTENTS INFORMATION  LOGICAL PAGE NUMBER = "11"/)
                    (ADDITIONAL OBJECT DESIGNATION  GROUP NAME = "bugaihi-2"  PRINT FLAG = "True"/)
                (/PAGE UNIT DESIGNATION)
            (/SHEET UNIT DESIGNATION)
        (/CHAPTER UNIT DESIGNATION)
    (/LAYOUT RELATED DESIGNATION)

(OUTPUT CONTROL DESIGNATION)
        (DETAILED PARAMETER  NUMBER OF PRINT SETS = "100"
            PRINTING RANGE = "1 TO 7"
            STAPLE = "UPPER LEFT"/)
    (/OUTPUT CONTROL DESIGNATION)

(/DESIGNATION UNIT)
```

FIG. 12

```
〈RECORDING UNIT〉
    〈PRINT PARAMETER  PRINTING RANGE = "1 TO 7"  NUMBER OF PRINT SETS = "100"  SPOOL = "UPPER LEFT"〉
        〈PRINT DEVICE INFORMATION  DEVICE NAME = "Printer-A"/〉
    〈/PRINT PARAMETER〉
〈/RECORDING UNIT〉

〈DESIGNATION UNIT〉
    〈ENTIRE DESIGNATION〉
        〈GROUP DESIGNATION  GROUP NAME = "bugaihi-1"  PRINT FLAG = "True"〉
            〈OBJECT LINK INFORMATION  LINK = "bugaihi.pdf"/〉
        〈/GROUP DESIGNATION〉
        〈GROUP DESIGNATION  GROUP NAME = "bugaihi-2"  PRINT FLAG = "True"〉
            〈OBJECT LINK INFORMATION  LINK = "confidential.pdf"/〉
        〈/GROUP DESIGNATION〉
    〈/ENTIRE DESIGNATION〉

〈LAYOUT RELATED DESIGNATION〉
        〈CHAPTER UNIT DESIGNATION〉
            〈SHEET UNIT DESIGNATION〉
                〈PAGE UNIT DESIGNATION  FRONT/BACK = "FRONT"〉
                    〈CONTENTS INFORMATION  LOGICAL PAGE NUMBER = "1"/〉
                    〈ADDITIONAL OBJECT DESIGNATION  GROUP NAME = "bugaihi-1"  PRINT FLAG = "True"/〉
                〈/PAGE UNIT DESIGNATION〉
            〈/SHEET UNIT DESIGNATION〉
            〈SHEET UNIT DESIGNATION〉
                〈PAGE UNIT DESIGNATION  FRONT/BACK = "FRONT"〉
                    〈CONTENTS INFORMATION  LOGICAL PAGE NUMBER = "2"/〉
                    〈ADDITIONAL OBJECT DESIGNATION  GROUP NAME = "bugaihi-1"  PRINT FLAG = "True"/〉
                〈/PAGE UNIT DESIGNATION〉
            〈/SHEET UNIT DESIGNATION〉
            〈SHEET UNIT DESIGNATION〉
                〈PAGE UNIT DESIGNATION  FRONT/BACK = "FRONT"〉
                    〈CONTENTS INFORMATION  LOGICAL PAGE NUMBER = "3"/〉
                    〈ADDITIONAL OBJECT DESIGNATION  GROUP NAME = "bugaihi-1"  PRINT FLAG = "True"/〉
                〈/PAGE UNIT DESIGNATION〉
            〈/SHEET UNIT DESIGNATION〉
        〈/CHAPTER UNIT DESIGNATION〉
        〈CHAPTER UNIT DESIGNATION〉
            〈SHEET UNIT DESIGNATION〉
                〈PAGE UNIT DESIGNATION  FRONT/BACK = "FRONT"〉
                    〈CONTENTS INFORMATION  LOGICAL PAGE NUMBER = "4"/〉
                    〈CONTENTS INFORMATION  LOGICAL PAGE NUMBER = "5"/〉
                    〈ADDITIONAL OBJECT DESIGNATION  GROUP NAME = "bugaihi-2"  PRINT FLAG = "True"/〉
                〈/PAGE UNIT DESIGNATION〉
                〈PAGE UNIT DESIGNATION  FRONT/BACK = "BACK"〉
                    〈CONTENTS INFORMATION  LOGICAL PAGE NUMBER = "6"/〉
                    〈CONTENTS INFORMATION  LOGICAL PAGE NUMBER = "7"/〉
                    〈ADDITIONAL OBJECT DESIGNATION  GROUP NAME = "bugaihi-2"  PRINT FLAG = "False"/〉
                〈/PAGE UNIT DESIGNATION〉
            〈/SHEET UNIT DESIGNATION〉
            〈SHEET UNIT DESIGNATION〉
                〈PAGE UNIT DESIGNATION  FRONT/BACK = "FRONT"〉
                    〈CONTENTS INFORMATION  LOGICAL PAGE NUMBER = "8"/〉
                    〈CONTENTS INFORMATION  LOGICAL PAGE NUMBER = "9"/〉
                    〈ADDITIONAL OBJECT DESIGNATION  GROUP NAME = "bugaihi-2"  PRINT FLAG = "True"/〉
                〈/PAGE UNIT DESIGNATION〉
                〈PAGE UNIT DESIGNATION  FRONT/BACK = "BACK"〉
                    〈CONTENTS INFORMATION  LOGICAL PAGE NUMBER = "10"/〉
                    〈CONTENTS INFORMATION  LOGICAL PAGE NUMBER = "11"/〉
                    〈ADDITIONAL OBJECT DESIGNATION  GROUP NAME = "bugaihi-2"  PRINT FLAG = "True"/〉
                〈/PAGE UNIT DESIGNATION〉
            〈/SHEET UNIT DESIGNATION〉
        〈/CHAPTER UNIT DESIGNATION〉
    〈/LAYOUT RELATED DESIGNATION〉

〈OUTPUT CONTROL DESIGNATION〉
        〈DETAILED PARAMETER  NUMBER OF PRINT SETS = "100"
                    PRINTING RANGE = "1 TO 7"
                    STAPLE = "UPPER LEFT"/〉
    〈/OUTPUT CONTROL DESIGNATION〉

〈/DESIGNATION UNIT〉
```

FIG. 15

```
(DESIGNATION UNIT)
    (ENTIRE DESIGNATION)
        (GROUP DESIGNATION  GROUP NAME = "annotation-1"  PRINT FLAG = "False")
            (OBJECT LINK INFORMATION  LINK = "hizuke.pdf"/)
        (/GROUP DESIGNATION)
        (GROUP DESIGNATION  GROUP NAME = "annotation-2"  PRINT FLAG = "True")
            (OBJECT LINK INFORMATION  LINK = "canon.pdf"/)
        (/GROUP DESIGNATION)
    (/ENTIRE DESIGNATION)

(LAYOUT RELATED DESIGNATION)
        (CHAPTER UNIT DESIGNATION)
            (SHEET UNIT DESIGNATION)
                (PAGE UNIT DESIGNATION  FRONT/BACK = "FRONT")
                    (CONTENTS INFORMATION  LOGICAL PAGE NUMBER = "1"  ID = "001"/)
                    (ADDITIONAL OBJECT DESIGNATION FOR PHYSICAL PAGE  GROUP NAME = "annotation-1"/)
                    (ADDITIONAL OBJECT DESIGNATION FOR LOGICAL PAGE  CONTENTS ID = "001"  GROUP NAME = "annotation-2"/)
                (/PAGE UNIT DESIGNATION)
            (/SHEET UNIT DESIGNATION)
            (SHEET UNIT DESIGNATION)
                (PAGE UNIT DESIGNATION  FRONT/BACK = "FRONT")
                    (CONTENTS INFORMATION  LOGICAL PAGE NUMBER = "2"  ID = "002"/)
                    (ADDITIONAL OBJECT DESIGNATION FOR PHYSICAL PAGE  GROUP NAME = "annotation-1"/)
                    (ADDITIONAL OBJECT DESIGNATION FOR LOGICAL PAGE  CONTENTS ID = "002"  GROUP NAME = "annotation-2"/)
                (/PAGE UNIT DESIGNATION)
            (/SHEET UNIT DESIGNATION)
            (SHEET UNIT DESIGNATION)
                (PAGE UNIT DESIGNATION  FRONT/BACK = "FRONT")
                    (CONTENTS INFORMATION  LOGICAL PAGE NUMBER = "3"  ID = "003"/)
                    (ADDITIONAL OBJECT DESIGNATION FOR PHYSICAL PAGE  GROUP NAME = "annotation-1"/)
                    (ADDITIONAL OBJECT DESIGNATION FOR LOGICAL PAGE  CONTENTS ID = "003"  GROUP NAME = "annotation-2"/)
                (/PAGE UNIT DESIGNATION)
            (/SHEET UNIT DESIGNATION)
        (/CHAPTER UNIT DESIGNATION)
        (CHAPTER UNIT DESIGNATION)
            (SHEET UNIT DESIGNATION)
                (PAGE UNIT DESIGNATION  FRONT/BACK = "FRONT")
                    (CONTENTS INFORMATION  LOGICAL PAGE NUMBER = "4"  ID = "004"/)
                    (CONTENTS INFORMATION  LOGICAL PAGE NUMBER = "5"  ID = "005"/)
                    (ADDITIONAL OBJECT DESIGNATION FOR PHYSICAL PAGE  GROUP NAME = "annotation-1"/)
                    (ADDITIONAL OBJECT DESIGNATION FOR LOGICAL PAGE  CONTENTS ID = "004"  GROUP NAME = "annotation-2"/)
                    (ADDITIONAL OBJECT DESIGNATION FOR LOGICAL PAGE  CONTENTS ID = "005"  GROUP NAME = "annotation-2"/)
                (/PAGE UNIT DESIGNATION)
                (PAGE UNIT DESIGNATION  FRONT/BACK = "BACK")
                    (CONTENTS INFORMATION  LOGICAL PAGE NUMBER = "6"  ID = "006"/)
                    (CONTENTS INFORMATION  LOGICAL PAGE NUMBER = "7"  ID = "007"/)
                    (ADDITIONAL OBJECT DESIGNATION FOR PHYSICAL PAGE  GROUP NAME = "annotation-1"/)
                    (ADDITIONAL OBJECT DESIGNATION FOR LOGICAL PAGE  CONTENTS ID = "006"  GROUP NAME = "annotation-2"/)
                    (ADDITIONAL OBJECT DESIGNATION FOR LOGICAL PAGE  CONTENTS ID = "007"  GROUP NAME = "annotation-2"/)
                (/PAGE UNIT DESIGNATION)
            (/SHEET UNIT DESIGNATION)
            (SHEET UNIT DESIGNATION)
                (PAGE UNIT DESIGNATION  FRONT/BACK = "FRONT")
                    (CONTENTS INFORMATION  LOGICAL PAGE NUMBER = "8"  ID = "008"/)
                    (CONTENTS INFORMATION  LOGICAL PAGE NUMBER = "9"  ID = "009"/)
                    (ADDITIONAL OBJECT DESIGNATION FOR PHYSICAL PAGE  GROUP NAME = "annotation-1"/)
                    (ADDITIONAL OBJECT DESIGNATION FOR LOGICAL PAGE  CONTENTS ID = "008"  GROUP NAME = "annotation-2"/)
                    (ADDITIONAL OBJECT DESIGNATION FOR LOGICAL PAGE  CONTENTS ID = "009"  GROUP NAME = "annotation-2"/)
                (/PAGE UNIT DESIGNATION)
                (PAGE UNIT DESIGNATION  FRONT/BACK = "FRONT")
                    (CONTENTS INFORMATION  LOGICAL PAGE NUMBER = "10"  ID = "010"/)
                    (CONTENTS INFORMATION  LOGICAL PAGE NUMBER = "11"  ID = "011"/)
                    (ADDITIONAL OBJECT DESIGNATION FOR PHYSICAL PAGE  GROUP NAME = "annotation-1"/)
                    (ADDITIONAL OBJECT DESIGNATION FOR LOGICAL PAGE  CONTENTS ID = "010"  GROUP NAME = "annotation-2"/)
                    (ADDITIONAL OBJECT DESIGNATION FOR LOGICAL PAGE  CONTENTS ID = "011"  GROUP NAME = "annotation-2"/)
                (/PAGE UNIT DESIGNATION)
            (/SHEET UNIT DESIGNATION)
        (/CHAPTER UNIT DESIGNATION)
    (/LAYOUT RELATED DESIGNATION)

(OUTPUT CONTROL DESIGNATION)
        (DETAILED PARAMETER  NUMBER OF PRINT SETS = "100"
            PRINTING RANGE = "1 TO 7"
            STAPLE = "UPPER LEFT"/)
    (/OUTPUT CONTROL DESIGNATION)
(/DESIGNATION UNIT)
```

FIG. 16

```
〈RECORDING UNIT〉
    〈PRINT PARAMETER  PRINTING RANGE = "1 TO 7"  NUMBER OF PRINT SETS = "100"  STAPLE = "UPPER LEFT"〉
        〈PRINT DEVICE INFORMATION  DEVICE NAME = "Printer-A"/〉
    〈/PRINT PARAMETER〉
〈/RECORDING UNIT〉

〈DESIGNATION UNIT〉
    〈ENTIRE DESIGNATION〉
        〈GROUP DESIGNATION  GROUP NAME = "annotation-1"  PRINT FLAG = "False"〉
            〈OBJECT LINK INFORMATION  LINK = "hizuke.pdf"/〉
        〈/GROUP DESIGNATION〉
        〈GROUP DESIGNATION  GROUP NAME = "annotation-2"  PRINT FLAG = "True"〉
            〈OBJECT LINK INFORMATION  LINK = "canon.pdf"/〉
        〈/GROUP DESIGNATION〉
    〈/ENTIRE DESIGNATION〉

〈LAYOUT RELATED DESIGNATION〉
        〈CHAPTER UNIT DESIGNATION〉
            〈SHEET UNIT DESIGNATION〉
                〈PAGE UNIT DESIGNATION  FRONT/BACK = "FRONT"〉
                    〈CONTENTS INFORMATION  LOGICAL PAGE NUMBER = "1"  ID = "001"/〉
                    〈ADDITIONAL OBJECT DESIGNATION FOR PHYSICAL PAGE  GROUP NAME = "annotation-1"/〉
                    〈ADDITIONAL OBJECT DESIGNATION FOR LOGICAL PAGE  CONTENTS ID = "001"  GROUP NAME = "annotation-2"/〉
                〈/PAGE UNIT DESIGNATION〉
            〈/SHEET UNIT DESIGNATION〉
            〈SHEET UNIT DESIGNATION〉
                〈PAGE UNIT DESIGNATION  FRONT/BACK = "FRONT"〉
                    〈CONTENTS INFORMATION  LOGICAL PAGE NUMBER = "2"  ID = "002"/〉
                    〈ADDITIONAL OBJECT DESIGNATION FOR PHYSICAL PAGE  GROUP NAME = "annotation-1"/〉
                    〈ADDITIONAL OBJECT DESIGNATION FOR LOGICAL PAGE  CONTENTS ID = "002"  GROUP NAME = "annotation-2"/〉
                〈/PAGE UNIT DESIGNATION〉
            〈/SHEET UNIT DESIGNATION〉
            〈SHEET UNIT DESIGNATION〉
                〈PAGE UNIT DESIGNATION  FRONT/BACK = "FRONT"〉
                    〈CONTENTS INFORMATION  LOGICAL PAGE NUMBER = "3"  ID = "003"/〉
                    〈ADDITIONAL OBJECT DESIGNATION FOR PHYSICAL PAGE  GROUP NAME = "annotation-1"/〉
                    〈ADDITIONAL OBJECT DESIGNATION FOR LOGICAL PAGE  CONTENTS ID = "003"  GROUP NAME = "annotation-2"/〉
                〈/PAGE UNIT DESIGNATION〉
            〈/SHEET UNIT DESIGNATION〉
        〈/CHAPTER UNIT DESIGNATION〉
        〈CHAPTER UNIT DESIGNATION〉
            〈SHEET UNIT DESIGNATION〉
                〈PAGE UNIT DESIGNATION  FRONT/BACK = "FRONT"〉
                    〈CONTENTS INFORMATION  LOGICAL PAGE NUMBER = "4"  ID = "004"/〉
                    〈CONTENTS INFORMATION  LOGICAL PAGE NUMBER = "5"  ID = "005"/〉
                    〈ADDITIONAL OBJECT DESIGNATION FOR PHYSICAL PAGE  GROUP NAME = "annotation-1"/〉
                    〈ADDITIONAL OBJECT DESIGNATION FOR LOGICAL PAGE  CONTENTS ID = "004"  GROUP NAME = "annotation-2"/〉
                    〈ADDITIONAL OBJECT DESIGNATION FOR LOGICAL PAGE  CONTENTS ID = "005"  GROUP NAME = "annotation-2"/〉
                〈/PAGE UNIT DESIGNATION〉
                〈PAGE UNIT DESIGNATION  FRONT/BACK = "BACK"〉
                    〈CONTENTS INFORMATION  LOGICAL PAGE NUMBER = "6"  ID = "006"/〉
                    〈CONTENTS INFORMATION  LOGICAL PAGE NUMBER = "7"  ID = "007"/〉
                    〈ADDITIONAL OBJECT DESIGNATION FOR PHYSICAL PAGE  GROUP NAME = "annotation-1"/〉
                    〈ADDITIONAL OBJECT DESIGNATION FOR LOGICAL PAGE  CONTENTS ID = "006"  GROUP NAME = "annotation-2"/〉
                    〈ADDITIONAL OBJECT DESIGNATION FOR LOGICAL PAGE  CONTENTS ID = "007"  GROUP NAME = "annotation-2"/〉
                〈/PAGE UNIT DESIGNATION〉
            〈/SHEET UNIT DESIGNATION〉
            〈SHEET UNIT DESIGNATION〉
                〈PAGE UNIT DESIGNATION  FRONT/BACK = "FRONT"〉
                    〈CONTENTS INFORMATION  LOGICAL PAGE NUMBER = "8"  ID = "008"/〉
                    〈CONTENTS INFORMATION  LOGICAL PAGE NUMBER = "9"  ID = "009"/〉
                    〈ADDITIONAL OBJECT DESIGNATION FOR PHYSICAL PAGE  GROUP NAME = "annotation-1"/〉
                    〈ADDITIONAL OBJECT DESIGNATION FOR LOGICAL PAGE  CONTENTS ID = "008"  GROUP NAME = "annotation-2"/〉
                    〈ADDITIONAL OBJECT DESIGNATION FOR LOGICAL PAGE  CONTENTS ID = "009"  GROUP NAME = "annotation-2"/〉
                〈/PAGE UNIT DESIGNATION〉
                〈PAGE UNIT DESIGNATION  FRONT/BACK = "FRONT"〉
                    〈CONTENTS INFORMATION  LOGICAL PAGE NUMBER = "10"  ID = "010"/〉
                    〈CONTENTS INFORMATION  LOGICAL PAGE NUMBER = "11"  ID = "011"/〉
                    〈ADDITIONAL OBJECT DESIGNATION FOR PHYSICAL PAGE  GROUP NAME = "annotation-1"/〉
                    〈ADDITIONAL OBJECT DESIGNATION FOR LOGICAL PAGE  CONTENTS ID = "010"  GROUP NAME = "annotation-2"/〉
                    〈ADDITIONAL OBJECT DESIGNATION FOR LOGICAL PAGE  CONTENTS ID = "011"  GROUP NAME = "annotation-2"/〉
                〈/PAGE UNIT DESIGNATION〉
            〈/SHEET UNIT DESIGNATION〉
        〈/CHAPTER UNIT DESIGNATION〉
    〈/LAYOUT RELATED DESIGNATION〉

〈OUTPUT CONTROL DESIGNATION〉
        〈DETAILED PARAMETER  NUMBER OF PRINT SETS = "100"
            PRINTING RANGE = "1 TO 7"
            STAPLE = "UPPER LEFT"/〉
    〈/OUTPUT CONTROL DESIGNATION〉
〈/DESIGNATION UNIT〉
```

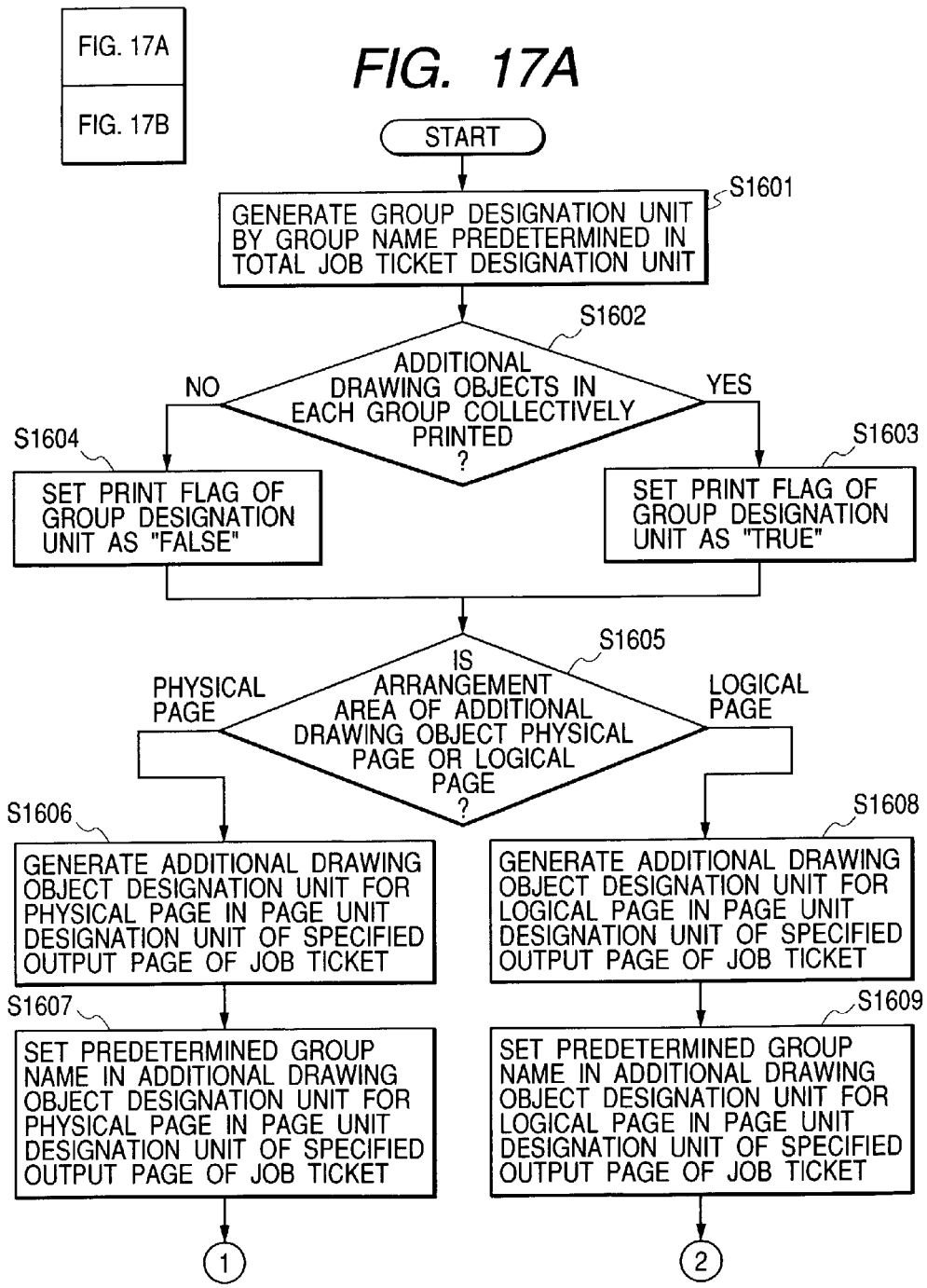

FIG. 19

```
⟨DESIGNATION UNIT⟩
    ⟨ENTIRE DESIGNATION⟩
        ⟨GROUP DESIGNATION  GROUP NAME = "annotation-1"  PRINT FLAG = "True"⟩
            ⟨OBJECT LINK INFORMATION  LINK = "hizuke.pdf"/⟩
        ⟨/GROUP DESIGNATION⟩
        ⟨GROUP DESIGNATION  GROUP NAME = "annotation-2"  PRINT FLAG = "True"⟩
            ⟨OBJECT LINK INFORMATION  LINK = "canon.pdf"/⟩
        ⟨/GROUP DESIGNATION⟩
    ⟨/ENTIRE DESIGNATION⟩

⟨LAYOUT RELATED DESIGNATION⟩
        ⟨CHAPTER UNIT DESIGNATION⟩
            ⟨SHEET UNIT DESIGNATION⟩
                ⟨PAGE UNIT DESIGNATION  FRONT/BACK = "FRONT"⟩
                    ⟨CONTENTS INFORMATION  LOGICAL PAGE NUMBER = "1"  ID = "001"/⟩
                    ⟨ADDITIONAL OBJECT DESIGNATION FOR PHYSICAL PAGE  GROUP NAME = "annotation-1"/⟩
                    ⟨ADDITIONAL OBJECT DESIGNATION FOR LOGICAL PAGE  CONTENTS ID = "001"  GROUP NAME = "annotation-2"  PRINT FLAG = "True"/⟩
                ⟨/PAGE UNIT DESIGNATION⟩
            ⟨/SHEET UNIT DESIGNATION⟩
            ⟨SHEET UNIT DESIGNATION⟩
                ⟨PAGE UNIT DESIGNATION  FRONT/BACK = "FRONT"⟩
                    ⟨CONTENTS INFORMATION  LOGICAL PAGE NUMBER = "2"  ID = "002"/⟩
                    ⟨ADDITIONAL OBJECT DESIGNATION FOR PHYSICAL PAGE  GROUP NAME = "annotation-1"/⟩
                    ⟨ADDITIONAL OBJECT DESIGNATION FOR LOGICAL PAGE  CONTENTS ID = "002"  GROUP NAME = "annotation-2"  PRINT FLAG = "True"/⟩
                ⟨/PAGE UNIT DESIGNATION⟩
            ⟨/SHEET UNIT DESIGNATION⟩
            ⟨SHEET UNIT DESIGNATION⟩
                ⟨PAGE UNIT DESIGNATION  FRONT/BACK = "FRONT"⟩
                    ⟨CONTENTS INFORMATION  LOGICAL PAGE NUMBER = "3"  ID = "003"/⟩
                    ⟨ADDITIONAL OBJECT DESIGNATION FOR PHYSICAL PAGE  GROUP NAME = "annotation-1"/⟩
                    ⟨ADDITIONAL OBJECT DESIGNATION FOR LOGICAL PAGE  CONTENTS ID = "003"  GROUP NAME = "annotation-2"/⟩
                ⟨/PAGE UNIT DESIGNATION⟩
            ⟨/SHEET UNIT DESIGNATION⟩
        ⟨/CHAPTER UNIT DESIGNATION⟩
        ⟨CHAPTER UNIT DESIGNATION⟩
            ⟨SHEET UNIT DESIGNATION⟩
                ⟨PAGE UNIT DESIGNATION  FRONT/BACK = "FRONT"⟩
                    ⟨CONTENTS INFORMATION  LOGICAL PAGE NUMBER = "4"  ID = "004"/⟩
                    ⟨CONTENTS INFORMATION  LOGICAL PAGE NUMBER = "5"  ID = "005"/⟩
                    ⟨ADDITIONAL OBJECT DESIGNATION FOR PHYSICAL PAGE  GROUP NAME = "annotation-1"  PRINT FLAG = "False"/⟩
                    ⟨ADDITIONAL OBJECT DESIGNATION FOR LOGICAL PAGE  CONTENTS ID = "004"  GROUP NAME = "annotation-2"  PRINT FLAG = "True"/⟩
                    ⟨ADDITIONAL OBJECT DESIGNATION FOR LOGICAL PAGE  CONTENTS ID = "005"  GROUP NAME = "annotation-2"  PRINT FLAG = "True"/⟩
                ⟨/PAGE UNIT DESIGNATION⟩
                ⟨PAGE UNIT DESIGNATION  FRONT/BACK = "BACK"⟩
                    ⟨CONTENTS INFORMATION  LOGICAL PAGE NUMBER = "6"  ID = "006"/⟩
                    ⟨CONTENTS INFORMATION  LOGICAL PAGE NUMBER = "7"  ID = "007"/⟩
                    ⟨ADDITIONAL OBJECT DESIGNATION FOR PHYSICAL PAGE  GROUP NAME = "annotation-1"/⟩
                    ⟨ADDITIONAL OBJECT DESIGNATION FOR LOGICAL PAGE  CONTENTS ID = "006"  GROUP NAME = "annotation-2"  PRINT FLAG = "True"/⟩
                    ⟨ADDITIONAL OBJECT DESIGNATION FOR LOGICAL PAGE  CONTENTS ID = "007"  GROUP NAME = "annotation-2"  PRINT FLAG = "True"/⟩
                ⟨/PAGE UNIT DESIGNATION⟩
            ⟨/SHEET UNIT DESIGNATION⟩
            ⟨SHEET UNIT DESIGNATION⟩
                ⟨PAGE UNIT DESIGNATION  FRONT/BACK = "FRONT"⟩
                    ⟨CONTENTS INFORMATION  LOGICAL PAGE NUMBER = "8"  ID = "008"/⟩
                    ⟨CONTENTS INFORMATION  LOGICAL PAGE NUMBER = "9"  ID = "009"/⟩
                    ⟨ADDITIONAL OBJECT DESIGNATION FOR PHYSICAL PAGE  GROUP NAME = "annotation-1"/⟩
                    ⟨ADDITIONAL OBJECT DESIGNATION FOR LOGICAL PAGE  CONTENTS ID = "008"  GROUP NAME = "annotation-2"  PRINT FLAG = "True"/⟩
                    ⟨ADDITIONAL OBJECT DESIGNATION FOR LOGICAL PAGE  CONTENTS ID = "009"  GROUP NAME = "annotation-2"  PRINT FLAG = "True"/⟩
                ⟨/PAGE UNIT DESIGNATION⟩
                ⟨PAGE UNIT DESIGNATION  FRONT/BACK = "BACK"⟩
                    ⟨CONTENTS INFORMATION  LOGICAL PAGE NUMBER = "10"  ID = "010"/⟩
                    ⟨CONTENTS INFORMATION  LOGICAL PAGE NUMBER = "11"  ID = "011"/⟩
                    ⟨ADDITIONAL OBJECT DESIGNATION FOR PHYSICAL PAGE  GROUP NAME = "annotation-1"/⟩
                    ⟨ADDITIONAL OBJECT DESIGNATION FOR LOGICAL PAGE  CONTENTS ID = "010"  GROUP NAME = "annotation-2"  PRINT FLAG = "False"/⟩
                    ⟨ADDITIONAL OBJECT DESIGNATION FOR LOGICAL PAGE  CONTENTS ID = "011"  GROUP NAME = "annotation-2"  PRINT FLAG = "False"/⟩
                ⟨/PAGE UNIT DESIGNATION⟩
            ⟨/SHEET UNIT DESIGNATION⟩
        ⟨/CHAPTER UNIT DESIGNATION⟩
    ⟨/LAYOUT RELATED DESIGNATION⟩

⟨OUTPUT CONTROL DESIGNATION⟩
        ⟨DETAILED PARAMETER  NUMBER OF PRINT SETS = "100"
            PRINTING RANGE = "1 TO 7"
            STAPLE = "UPPER LEFT"/⟩
    ⟨/OUTPUT CONTROL DESIGNATION⟩
⟨/DESIGNATION UNIT⟩
```

FIG. 20

```
(RECORDING UNIT)
    (PRINT PARAMETER  PRINTING RANGE = "1 TO 7"  NUMBER OF PRINT SETS = "100"  STAPLE = "UPPER LEFT")
        (PRINT DEVICE INFORMATION  DEVICE NAME = "Printer-A"/)
    (/PRINT PARAMETER)
(/RECORDING UNIT)
(DESIGNATION UNIT)
    (ENTIRE DESIGNATION)
        (GROUP DESIGNATION  GROUP NAME = "annotation-1"  PRINT FLAG = "True")
            (OBJECT LINK INFORMATION  LINK = "hizuke.pdf"/)
        (/GROUP DESIGNATION)
        (GROUP DESIGNATION  GROUP NAME = "annotation-2"  PRINT FLAG = "True")
            (OBJECT LINK INFORMATION  LINK = "canon.pdf"/)
        (/GROUP DESIGNATION)
    (/ENTIRE DESIGNATION)

(LAYOUT RELATED DESIGNATION)
        (CHAPTER UNIT DESIGNATION)
            (SHEET UNIT DESIGNATION)
                (PAGE UNIT DESIGNATION  FRONT/BACK = "FRONT")
                    (CONTENTS INFORMATION  LOGICAL PAGE NUMBER = "1"  ID = "001"/)
                    (ADDITIONAL OBJECT DESIGNATION FOR PHYSICAL PAGE  GROUP NAME = "annotation-1"/)
                    (ADDITIONAL OBJECT DESIGNATION FOR LOGICAL PAGE  CONTENTS ID = "001"  GROUP NAME = "annotation-2"  PRINT FLAG = "True"/)
                (/PAGE UNIT DESIGNATION)
            (/SHEET UNIT DESIGNATION)
            (SHEET UNIT DESIGNATION)
                (PAGE UNIT DESIGNATION  FRONT/BACK = "FRONT")
                    (CONTENTS INFORMATION  LOGICAL PAGE NUMBER = "2"  ID = "002"/)
                    (ADDITIONAL OBJECT DESIGNATION FOR PHYSICAL PAGE  GROUP NAME = "annotation-1"/)
                    (ADDITIONAL OBJECT DESIGNATION FOR LOGICAL PAGE  CONTENTS ID = "002"  GROUP NAME = "annotation-2"  PRINT FLAG = "True"/)
                (/PAGE UNIT DESIGNATION)
            (/SHEET UNIT DESIGNATION)
            (SHEET UNIT DESIGNATION)
                (PAGE UNIT DESIGNATION  FRONT/BACK = "FRONT")
                    (CONTENTS INFORMATION  LOGICAL PAGE NUMBER = "3"  ID = "003"/)
                    (ADDITIONAL OBJECT DESIGNATION FOR PHYSICAL PAGE  GROUP NAME = "annotation-1"/)
                    (ADDITIONAL OBJECT DESIGNATION FOR LOGICAL PAGE  CONTENTS ID = "003"  GROUP NAME = "annotation-2"  PRINT FLAG = "True"/)
                (/PAGE UNIT DESIGNATION)
            (/SHEET UNIT DESIGNATION)
        (/CHAPTER UNIT DESIGNATION)
        (CHAPTER UNIT DESIGNATION)
            (SHEET UNIT DESIGNATION)
                (PAGE UNIT DESIGNATION  FRONT/BACK = "FRONT")
                    (CONTENTS INFORMATION  LOGICAL PAGE NUMBER = "4"  ID = "004"/)
                    (CONTENTS INFORMATION  LOGICAL PAGE NUMBER = "5"  ID = "005"/)
                    (ADDITIONAL OBJECT DESIGNATION FOR PHYSICAL PAGE  GROUP NAME = "annotation-1"  PRINT FLAG = "False"/)
                    (ADDITIONAL OBJECT DESIGNATION FOR LOGICAL PAGE  CONTENTS ID = "004"  GROUP NAME = "annotation-2"  PRINT FLAG = "True"/)
                    (ADDITIONAL OBJECT DESIGNATION FOR LOGICAL PAGE  CONTENTS ID = "005"  GROUP NAME = "annotation-2"  PRINT FLAG = "True"/)
                (/PAGE UNIT DESIGNATION)
                (PAGE UNIT DESIGNATION  FRONT/BACK = "BACK")
                    (CONTENTS INFORMATION  LOGICAL PAGE NUMBER = "6"  ID = "006"/)
                    (CONTENTS INFORMATION  LOGICAL PAGE NUMBER = "7"  ID = "007"/)
                    (ADDITIONAL OBJECT DESIGNATION FOR PHYSICAL PAGE  GROUP NAME = "annotation-1"/)
                    (ADDITIONAL OBJECT DESIGNATION FOR LOGICAL PAGE  CONTENTS ID = "006"  GROUP NAME = "annotation-2"  PRINT FLAG = "True"/)
                    (ADDITIONAL OBJECT DESIGNATION FOR LOGICAL PAGE  CONTENTS ID = "007"  GROUP NAME = "annotation-2"  PRINT FLAG = "True"/)
                (/PAGE UNIT DESIGNATION)
            (/SHEET UNIT DESIGNATION)
            (SHEET UNIT DESIGNATION)
                (PAGE UNIT DESIGNATION  FRONT/BACK = "FRONT")
                    (CONTENTS INFORMATION  LOGICAL PAGE NUMBER = "8"  ID = "008"/)
                    (CONTENTS INFORMATION  LOGICAL PAGE NUMBER = "9"  ID = "009"/)
                    (ADDITIONAL OBJECT DESIGNATION FOR PHYSICAL PAGE  GROUP NAME = "annotation-1"/)
                    (ADDITIONAL OBJECT DESIGNATION FOR LOGICAL PAGE  CONTENTS ID = "008"  GROUP NAME = "annotation-2"  PRINT FLAG = "True"/)
                    (ADDITIONAL OBJECT DESIGNATION FOR LOGICAL PAGE  CONTENTS ID = "009"  GROUP NAME = "annotation-2"  PRINT FLAG = "True"/)
                (/PAGE UNIT DESIGNATION)
                (PAGE UNIT DESIGNATION  FRONT/BACK = "FRONT")
                    (CONTENTS INFORMATION  LOGICAL PAGE NUMBER = "10"  ID = "010"/)
                    (CONTENTS INFORMATION  LOGICAL PAGE NUMBER = "11"  ID = "011"/)
                    (ADDITIONAL OBJECT DESIGNATION FOR PHYSICAL PAGE  GROUP NAME = "annotation-1"/)
                    (ADDITIONAL OBJECT DESIGNATION FOR LOGICAL PAGE  CONTENTS ID = "010"  GROUP NAME = "annotation-2"  PRINT FLAG = "False"/)
                    (ADDITIONAL OBJECT DESIGNATION FOR LOGICAL PAGE  CONTENTS ID = "011"  GROUP NAME = "annotation-2"  PRINT FLAG = "False"/)
                (/PAGE UNIT DESIGNATION)
            (/SHEET UNIT DESIGNATION)
        (/CHAPTER UNIT DESIGNATION)
    (/LAYOUT RELATED DESIGNATION)

(OUTPUT CONTROL DESIGNATION)
        (DETAILED PARAMETER  NUMBER OF PRINT SETS = "100"
            PRINTING RANGE = "1 TO 7"
            STAPLE = "UPPER LEFT"/)
    (/OUTPUT CONTROL DESIGNATION)
(/DESIGNATION UNIT)
```

INFORMATION PROCESSING APPARATUS, PRINTING PROCESSING METHOD, AND PROGRAM THEREFOR

BACKGROUND OF THE INVENTION

1. Field of the Invention

The present invention relates to an information processing apparatus, a printing processing method, and a program therefor used in printing information according to a print instruction such as process, display, print, etc. (hereinafter also referred to as a "job ticket"), and more specifically used for the apparatus or system for performing a printing processing on the information according to a print instruction for control of the added information output capability in a printing environment holding a print instruction and print data.

2. Related Background Art

When a certain data to be printed (print data) is output, for example, the following methods (1) to (4) have conventionally been suggested as control methods for printing the data using an added information output capability such as an overlay output capability, etc.

(1) In the control method described in Japanese Patent Application Laid-Open No. 2-135524, etc., in a printer having an overlay output capability, the overlay output capability performs printout control based on a control command for the printer.

(2) In the control method described in Japanese Patent Application Laid-Open No. 8-202863, etc., print data (image data) is recorded in the internal memory of a printing device (printer) in advance, instruction data and personal data indicating an overlay are transmitted to the printing device, and the printing device combines the personal data and the specified image data and prints out the data.

(3) In the control method described in Japanese Patent Application Laid-Open No. 11-143668, etc., desired print data is transmitted to a printer by recording the settings of a watermark, a form overlay, etc. which are the functions of a printer driver in a host computer as a macro through a printer driver of the host computer, and executing the macro when necessary.

(4) Acrobat, an application of Adobe in the USA, enables an annotation to be added to a PDF document, and can switch back and forth between printing and no-printing of the annotation added to the document during printing. Additionally, a page number can be added to a PDF document.

Furthermore, there has recently been a system suggested for preparing a print instruction to document data to be printed (print data) as a job ticket independent of the document data, generating a printing job for appropriately correcting print data according to the print instruction described in the job ticket during printing, and performing printing processing. Then, the description contents of the job ticket have been standardized. Thus, the information about the printing layout (Nup), the number of print sets, etc. can currently be described in a job ticket in accordance with the JDF.

However, there have been the following problems (1) to (4) with the above-mentioned conventional control methods (1) to (4).

Problem (1)

In the control method (1) described in Japanese Patent Application Laid-Open No. 2-135524, etc., and the control method (2) described in Japanese Patent Application Laid-Open No. 8-202863, etc., a printing device has the function of overlaying image data (added information output capability), a print instruction is issued for the function, and a process is performed according to the print instruction as a temporary process. Therefore, it is not possible to perform printing processing, etc. by reusing the print data stored in the network.

Problem (2)

In the control method (3) described in Japanese Patent Application Laid-Open No. 11-143668, a watermark, a form overlay, etc. which are the functions of a printer driver is recorded as a macro through the printer driver of the host computer. Therefore, it is difficult to move the macro to, for example, another computer, server, etc. Furthermore, for example, printing processing cannot be performed by reusing print data stored in the network. Furthermore, when a macro is recorded, the settings of a printer driver are used, thereby, for example, disabling control of data in a page unit.

Problem (3)

One of the common problems with the control methods (1) to (3) is, for example, that it is necessary to embed in advance added information for corresponding print data in target print data when a print instruction and print data are communicated through a network, etc.

Problem (4)

In Acrobat of Adobe in the USA, an annotation is added to a document as described above, and the system can switch back and forth between printing and no-printing of the annotation added to the document during printing. However, the system can switch back and forth between printing and no-printing of the entire annotations added to the document. That is, the system cannot switch back and forth between printing a part of annotations and no-printing of another part of annotations. Furthermore, selecting printing/no-printing an annotation is performed by a user using a print dialog during printing. Therefore, printing or no-printing is to be selected each time printing processing is performed, thereby causing the problem of poor operability.

The above-mentioned added information refers to data such as an annotation, a watermark, a form overlay, variable data (data for printing data for clients in a specific position of printing such as direct mail, etc.), etc. It is hereinafter referred to as an "additional drawing object".

Furthermore, when an additional drawing object is embedded in print data, there arise the following problems 1 to 4.

<1> When reprinting processing is performed using print data and a print instruction once handled in printing processing, the updating, changing, correcting processes, etc. cannot be performed exclusively on the additional drawing object embedded in the corresponding print data.

<2> When the updating, changing, correcting processes, etc. are being tried exclusively on an additional drawing object, an application in which a process of embedding an additional drawing object in image data is required, and restrictions are placed on the operating system (OS), etc. operated in the application. Therefore, printable environments (for example, an OS, a printer, a display, etc.) have been limited. As a result, for example, it is impossible to issue a print correction instruction from a mobile phone, etc.

<3> When print data and a print instruction are exclusively stored, it has been necessary to store an application in which an additional drawing object is embedded in print data.

<4> When print data refers to a large volume of printing as many as several thousand pages, it has been difficult to collectively update, change, correct, etc. an additional drawing object relating to the print data on each page.

Since the currently standardized method of describing a job ticket includes no instructions for added information, the method of embedding added information in the print data itself as described above is used. However, when added information is embedded in print data, the added information is included in the print data. Therefore, only an alternative selection is made such as whether or not an annotation is to be printed during printing as in the Acrobat application, thereby bringing a user an inconvenient method.

SUMMARY OF THE INVENTION

The present invention has been developed to solve the above-mentioned problems, and first aims at providing an information processing apparatus, a printing processing method, and a program therefor that are capable of updating, changing, correcting, etc. exclusively an additional drawing object by configuring the system such that an instruction to print an additional drawing object (added information) in determining print settings in a printing environment of generating print data and print settings (job ticket) for print data.

Secondly, the present invention aims at providing an information processing apparatus, a printing processing method, and a program therefor that are capable of setting the addition of an additional drawing object (added information) to the entire document by configuring the system such that an instruction to provide the entire setting of a print instruction (job ticket) for print data with added information, and an instruction to provide each arbitrary unit with added information can be held, and are capable of setting whether or not an additional drawing object is to be added to an arbitrary unit (output sheet/manuscript page) independent of the entire setting.

The information processing apparatus according to the present invention solves the above-mentioned problems by the following configuration.

An information processing apparatus issues a print instruction by adding an additional drawing object to document data to be printed, and includes:

job ticket generation means for generating a job ticket describing print settings for document data; and additional drawing object setting means for determining settings for an additional drawing object to be added to the document data, wherein the job ticket generation means edits the job ticket depending on the settings for the additional drawing object by the additional drawing object setting means, and generates a job ticket describing a print flag indicating whether or not the additional drawing object is to be printed.

The present invention also solves the problems by a printing processing method including the step of realizing each configuration of the above-mentioned information processing apparatus.

The present invention further solves the above-mentioned problems by a printing control program including the step of realizing each configuration of the above-mentioned information processing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is an explanatory view of a job ticket obtained in the job ticket generating process;

FIG. 8 is an explanatory view of an example of the job ticket when no trouble is detected in a process result in the printing system;

FIG. 11 is an explanatory view of a job ticket obtained in the job ticket generating process in a second embodiment;

FIG. 12 is an explanatory view of an example of the job ticket when no trouble is detected in a process result in the printing system in a second embodiment;

FIG. 15 is an explanatory view of a job ticket obtained in the job ticket generating process in a third embodiment;

FIG. 16 is an explanatory view of an example of the job ticket when no trouble is detected in a process result in the printing system in a third embodiment;

FIG. 19 is an explanatory view of a job ticket obtained in the job ticket generating process in a fourth embodiment;

FIG. 20 is an explanatory view of an example of the job ticket when no trouble is detected in a process result in the printing system in a fourth embodiment.

DETAILED DESCRIPTION OF THE PREFERRED EMBODIMENTS

The embodiments of the present invention are described below by referring to the attached drawings.

First Embodiment

Figure 1:
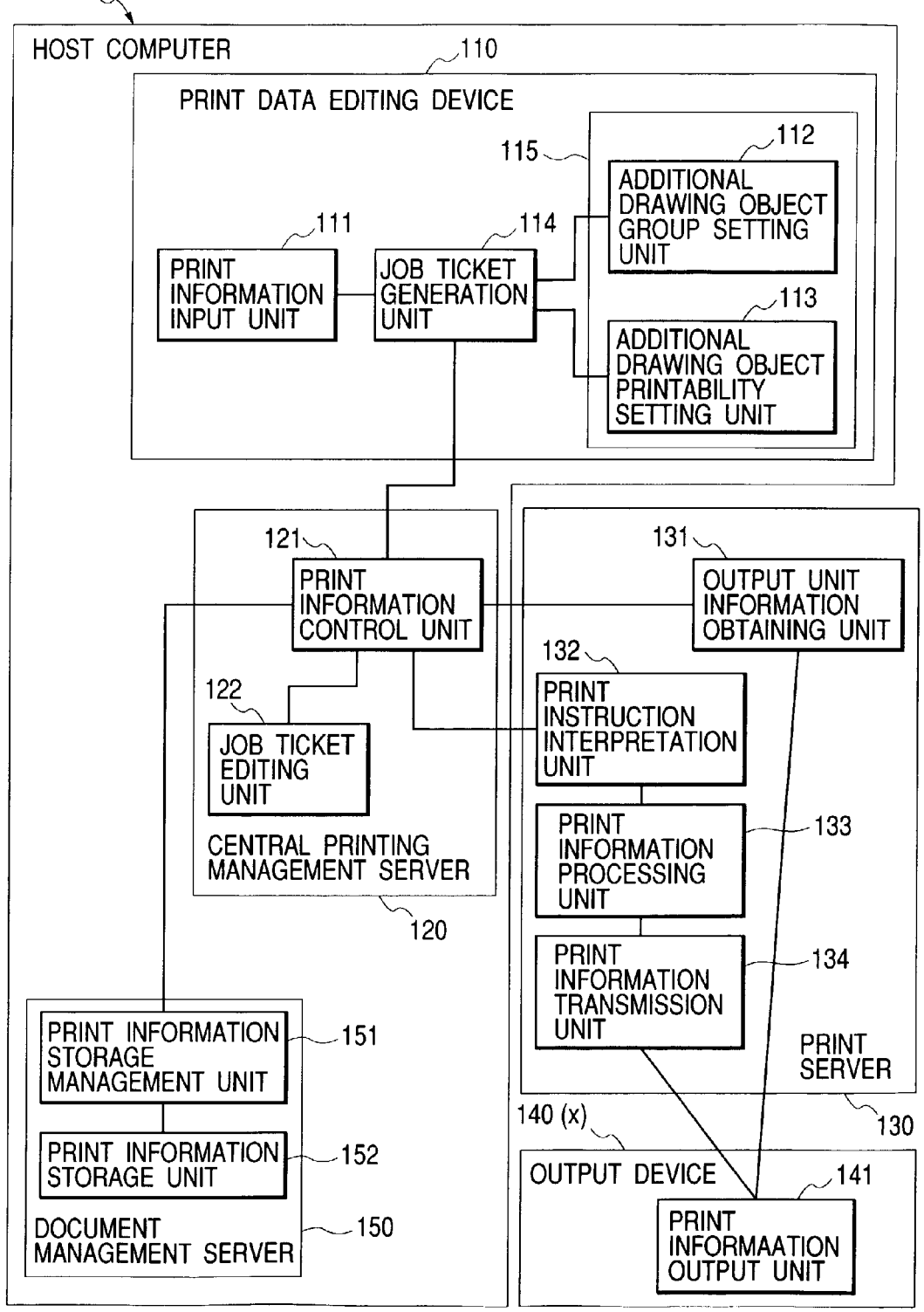
FIG. 1 is a block diagram of the configuration of the printing system to which the present invention is applied in a first embodiment.

The present invention is applied to the printing system as shown in FIG. 1.

<Configuration of Printing System>

The printing system is configured by connecting a host computer 100 (a print data editing device 110, a central printing management server 120, and a document management server 150) which is an information processing apparatus, a print server 130, and an output device (printing device) 140(x) through a network, etc. as communicable one another as shown in FIG. 1.

In FIG. 1, only one output device 140(x) is shown for simple explanation, but actually corresponds to an arbitrary output device 140(x) in a plurality of output devices 140(1), 140(2), . . . .

The print data editing device 110 of the host computer 100 comprises a print information input unit 111, an additional drawing object group setting unit 112, an additional drawing object printability setting unit 113, and a job ticket generation unit 114.

The print information input unit 111 inputs document data (hereinafter referred to as print data) which is the manuscript for printing, print data which is an additional drawing object for the print data for each page forming the manuscript, and print information, etc. including a print instruction such as processing, displaying, printing, etc. of print data.

The print information input unit 111 practically includes the function that an output module specified as an output destination when a document generated in an arbitrary application is output like the PDF Writer, receives the drawing contents (GDI function) output by an arbitrary application through a drawing means of the OS (DDI function), and converts them into a editable document format such as the PDF, etc.

Therefore, the document data passed from the print information input unit 111 to the job ticket generation unit 114 is represented as print data in the following explanation, but corresponds to the document in the format editable in the present system (for example, PDF), and is different from a printer control command in a data format depending on the output device as the PDL (page description language). The print information input unit 111 has the function of editing print data of an input manuscript by changing the page order of the paged forming the manuscript, deleting the pages, etc. Furthermore, it has a print setting function that allows a user to set print settings when the print data of the manuscript is printed, where the print settings include printing layout (Nup printing, poster printing), printing method (simplex/duplex printing, book printing), margin settings, finishing settings (staple, central binding, punch).

The additional drawing object group setting unit 112 has the configuration for setting the group to which the additional drawing object for print data belongs when drawing objects which are added information such as a watermark, a date, etc. are added to the print data of each page generated by the job ticket generation unit. The additional drawing object printability setting unit 113 is configured to set whether or not an additional drawing object added to the print data is to be printed for each page or for each group. The additional drawing object group setting unit 112 and the additional drawing object printability setting unit 113 are collectively referred to as a drawing object addition setting unit 115.

The job ticket generation unit 114 generates a job ticket describing print settings for document data based on the information (print instruction information such as processing, displaying, printing, etc. of print data) input by the print information input unit 111, the information (information about a group to which an additional drawing object of each page belongs) set by the additional drawing object group setting unit 112, and the information (information whether or not an additional drawing object is to be printed for each page or for each group), etc. set by the additional drawing object printability setting unit 113. Described on the generated job ticket are layout designation indicating the form arrangement of each page of print data edited by the editing capability of the print information input unit 111, the designation (link) of an additional drawing object, the group designation of an additional drawing object belonging to, the information about whether or not an additional drawing object is to be printed for each group, the number of print sets, the finishing designation, etc. The job ticket is generate independent of document data (print data) The detailed explanation is described later by referring to FIG. 7.

The central printing management server 120 of the host computer 100 comprises a print information control unit 121 and a job ticket editing unit 122. Each configuration of the central printing management server 120 can be a device separate from the host computer 100, but it is desired that it is provided in the host computer 110.

The print information control unit 121 controls a printing operation based on a set of print information including the job ticket generated by the job ticket generation unit 114 and the print data. The job ticket editing unit 122 has the function of editing all or a part of the instructions by the job ticket generated by the job ticket generation unit 114 by adding, changing, etc.

The print server 130 comprises an output unit information obtaining unit 131, a print instruction interpretation unit 132, a print information processing unit 133, and a print information transmission unit 134. The print server 130 is explained separate from the host computer 100, but each configuration of the print server 130 can be provided in the host computer 100.

The output unit information obtaining unit 131 has the function of obtaining the information about the operation status of the output device 140(x), the output device ID, etc.

The print instruction interpretation unit 132 has the function of interpreting the job ticket generated by the job ticket generation unit 114, and the job ticket edited by the job ticket editing unit 122.

The print information processing unit 133 has the function of processing the print information based on the interpretation result of the print instruction interpretation unit 132, and preparing for the output. The print information processing unit 133 practically corresponds to the printer driver corresponding to an output device 140, and generates a printing job described in page description language based on the interpretation result by the print instruction interpretation unit 132.

The print information transmission unit 134 has the function of transmitting a printing job processed by the print information processing unit 133 to the output device 140(x) such as a printer, etc.

The output device 140(x) comprises a print information output unit 141, and the print information output unit 141 converts the printing job into an output image and outputs the result as an image on a recording sheet.

A document management server 150 of the host computer 100 comprises a print information storage management unit 151 and a print information storage unit 152. Each configuration of the central printing management server 120 can be provided in a device separate from the host computer 100, but it is desired that each configuration is provided in the host computer 100.

The print information storage management unit 151 manages the print information storage unit 152. The print information storage unit 152 stores print information including a set of a job ticket and print data.

In the present embodiment, an additional drawing object is a "watermark" for example, the output device 140(x) is a printer connected in a network, and the printer performs printing processing. It is also assumed that whether or not group collective printing is performed can be set.

<Operation of Printing System 100>

FIGS. 2 to 5 are flowcharts of the operations of the host computer 100 and the print server 130 as a printing system.

Figure 2:
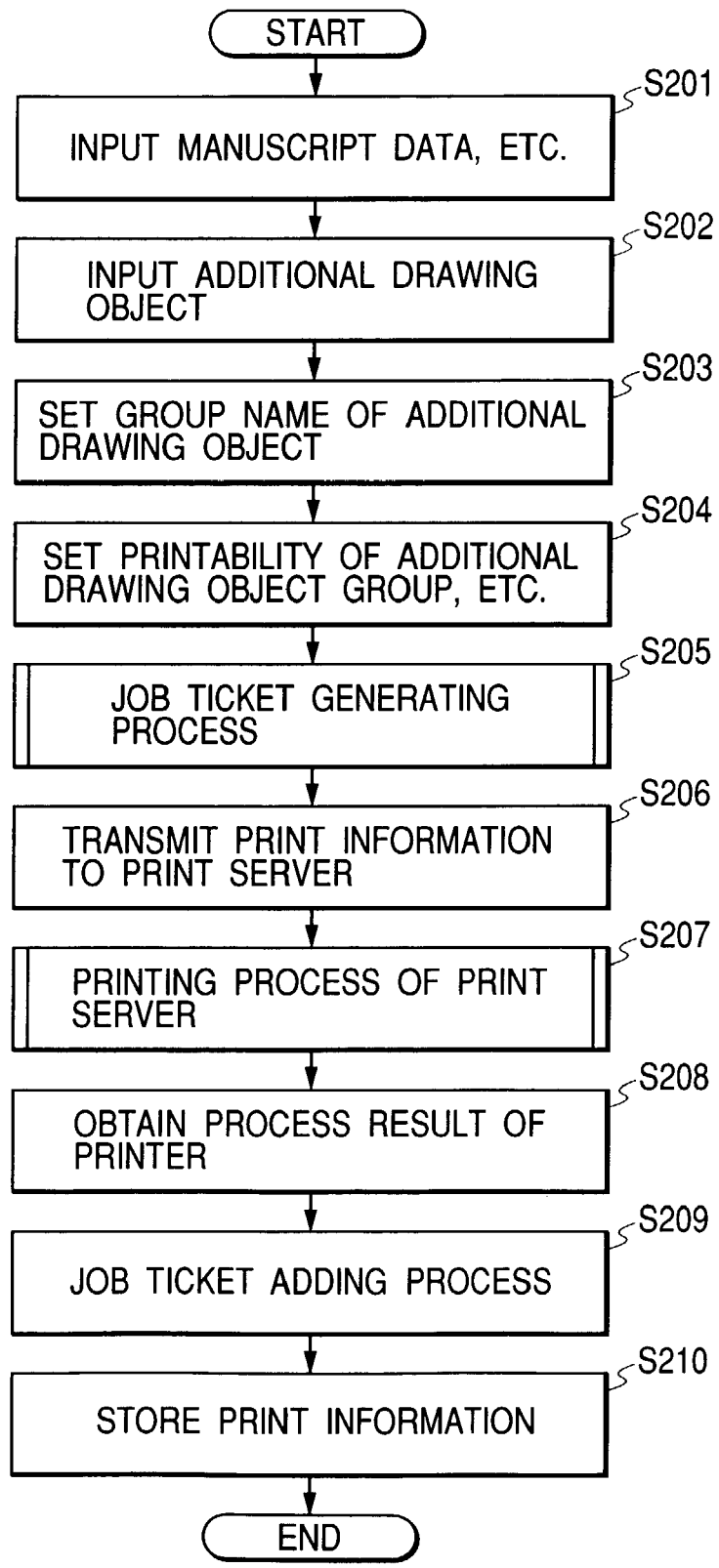
FIG. 2 is a flowchart for explanation of the operations of the printing system.

Step S201: Refer to FIG. 2.

In the print data editing device 110 of the host computer 100, the print information input unit 111 inputs information to be printed from an arbitrary application, and converts the format, thereby inputting print data and a print instruction.

As print data, for example, data in accordance with the PDF (Portable Document Format) is applicable. A print instruction can be, for example, the number of print sets, the form size, various finishing processes, simplex/duplex, N-Up, enlargement/reduction, print page designation, etc.

Step S202:

The drawing object addition setting unit 115 inputs an additional drawing object at the designation of a user.

Figure 6:
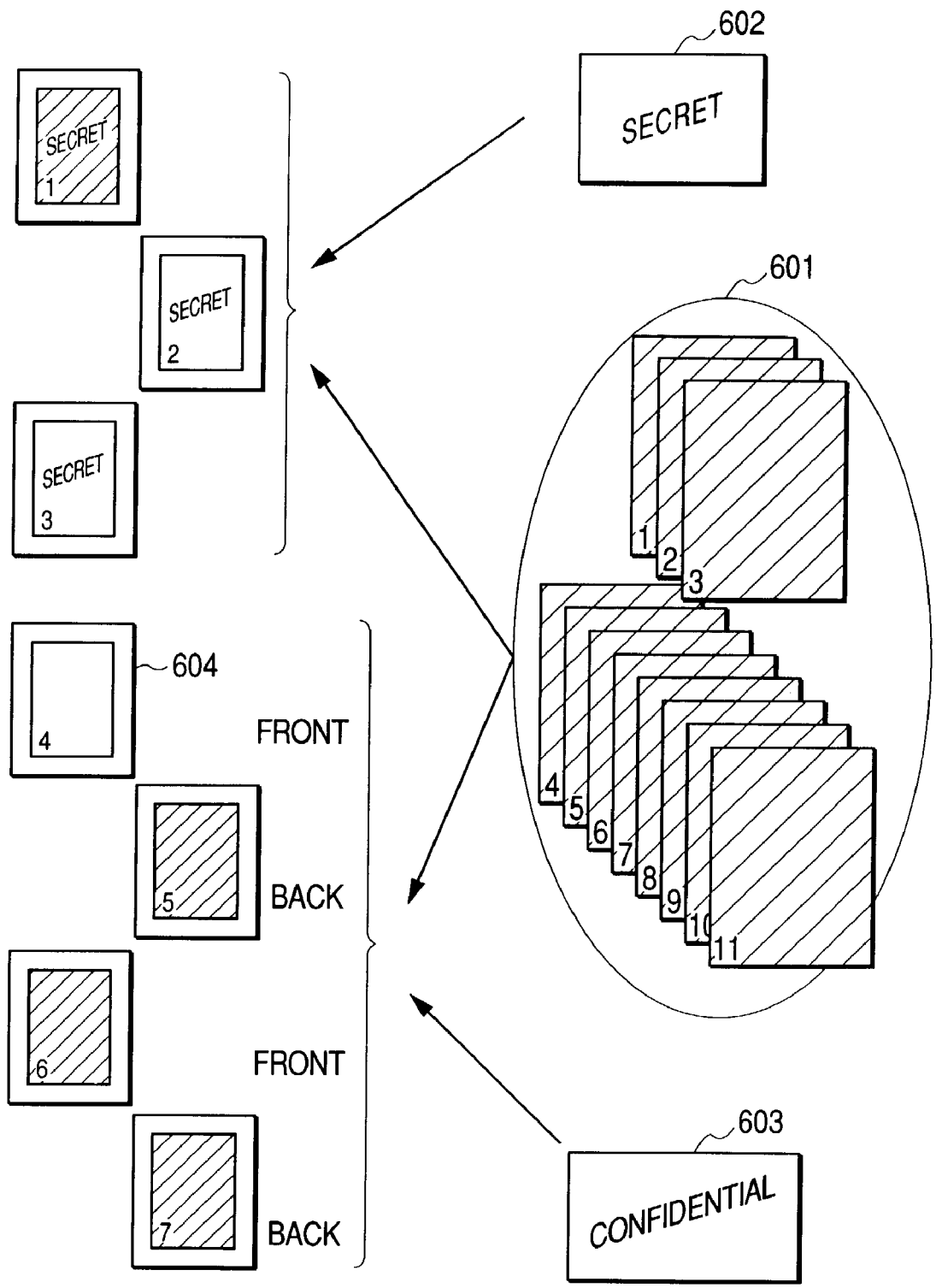
FIG. 6 is an explanatory view of an example of input data and an output result in the printing system.

Practically, for example, a watermark 602 of "Secret" and a watermark 603 of "Confidential" as shown in FIG. 6 are used as additional drawing objects. Like print data 601 (in this example, print data on pages 1 to 11) for each page, these watermarks 602 and 603 are generated as a different image file in advance, and inserted in each print area of each image data for printing.

It is assumed that a job ticket holds only a link to a file.

Step S203:

The additional drawing object group setting unit 112 sets the group name of the additional drawing object input by the drawing object addition setting unit 115.

Step S204:

The additional drawing object printability setting unit 113 sets the printability of each group of the additional drawing objects set by the additional drawing object group setting unit 112.

A plurality of additional drawing objects can be input by changing the group name of an additional drawing object by the additional drawing object group setting unit 112.

Step S205:

The job ticket generation unit 114 generates a job ticket according to the print instruction (number of print sets, form size, staple, color printing, simplex/duplex printing, N-Up, enlargement/reduction, printing page designation, etc.) input by the print information input unit 111 and the information about the additional drawing object (watermark, annotation, stamp, etc.) input by the drawing object addition setting unit 115.

Figure 3:
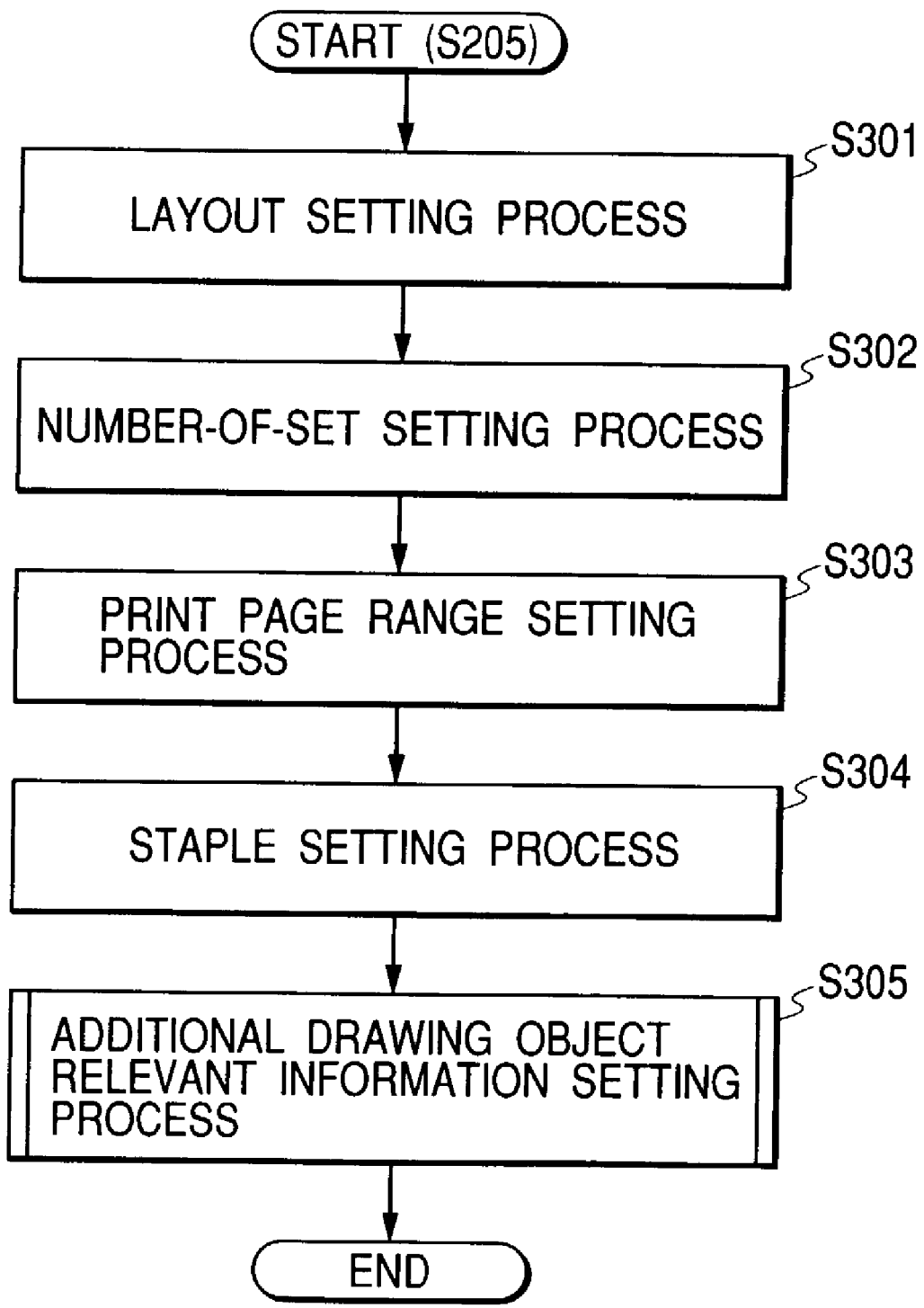
FIG. 3 is a flowchart for explanation of a job ticket generating process in the operations of the printing system.

Practically, first in step S301 as shown in FIG. 3, for example, the job ticket generation unit 114 sets in a job ticket the N-Up input by the print information input unit 111, the enlargement/reduction, the form size, or the information about the layout such as simplex/duplex printing, etc. (layout setting process). In step S302, the job ticket generation unit 114 performs the settings for the number of print sets in the job ticket (number-of-print-sets setting process). Then, in step S303, the job ticket generation unit 114 sets the print page range in the job ticket (print page range designating process). In step S304, the job ticket generation unit sets the staple information in the job ticket (staple setting process). Then, in step S305, the job ticket generation unit 114 sets the information about the additional drawing object input by the drawing object addition setting unit 115 in the job ticket (additional drawing object relevant information setting process).

Figure 4:
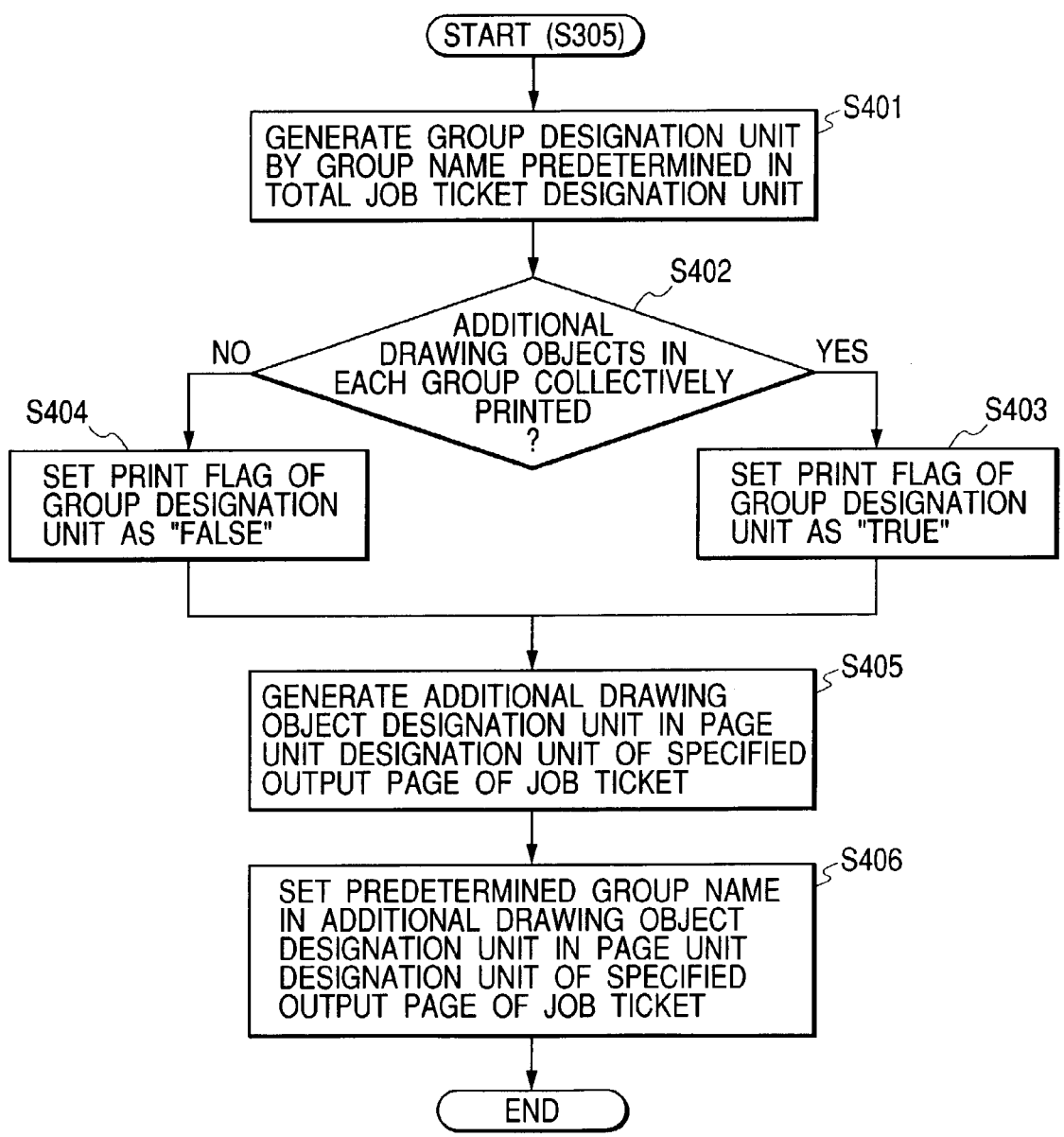
FIG. 4 is a flowchart for explanation of an additional drawing object relevant information setting process in the job ticket generating process.

FIG. 4 practically shows the additional drawing object relevant information setting process in step S305.

In the additional drawing object relevant information setting process in step S305, first in step S401, the job ticket generation unit 114, for example, generates a <group designation unit> under an <entire designation unit> which is an entire setting area of a job ticket using a group name ("bugaihi-1", etc.) set in advance by the additional drawing object group setting unit 112 as shown in FIG. 7.

Next, in step S402, the job ticket generation unit 114 determines whether or not additional drawing objects are collectively printed for each group according to the printability for each group of the additional drawing objects set in advance by the additional drawing object printability setting unit 113. If it is determined that the collective printing is not to be performed, then the process in step S404 is performed. If it is determined that the collective printing is to be performed, then the process in step S403 is performed.

For example, when additional drawing objects of a target group are collectively printed, the job ticket generation unit 114 sets "True" for the print flag (the print flag of the <group designation unit> of the job ticket) corresponding to the target group in step S403 as shown in FIG. 7.

If additional drawing objects of a target group are not printed, the job ticket generation unit 114 sets "False" for the print flag (the print flag of the <group designation unit> of the job ticket) corresponding to the target group in step S404 as shown in FIG. 7.

In step S405 after the process in step S403 or S404, the job ticket generation unit 114 generates an <additional object designation unit> for a  (corresponding to a setting area of each print unit (chapter, sheet, page)) of the printout page specified by a job ticket as shown in FIG. 7.

In step S406, the job ticket generation unit 114 sets the group name used in step S401 for the <additional drawing object designation unit> generated in step S405 as shown in FIG. 7.

Thus, the target group can be associated with the additional drawing object.

Based on the result of the job ticket generating process (in FIGS. 3 and 4) in step S205 as described above, the job ticket as shown in FIG. 7 is obtained.

FIG. 7 shows an example of a part of the job ticket used when a setting result of the additional drawing object relevant information and a print instruction are set in the XML system, but other appropriate methods can also be applied. A link is shown with each file name only. As shown in FIG. 7, the job ticket generation unit 114 writes the group name of an additional drawing object and a print flag (flag indicating whether or not a drawing is to be added) corresponding to a target group to the entire setting of the job ticket, and writes the group name of the additional drawing object to the target printout page at the additional drawing object designation from the drawing object addition setting unit 115. Thus, for example, in the case of an annotation, if the annotation is displayed when the manuscript of print data is displayed in the application on the host computer 100, and the annotation is not printed during printing, then the above-mentioned job ticket is generated. Thus, the added object is not printed if the print flag corresponding to the target group of the additional drawing object written to the entire setting of the job ticket is described as "False" (it is obvious that 0 or 1 can be set). Therefore, a user-desired printing result can be easily obtained. If added drawing object is to be printed, then it can be realized only by changing the print flag of the target group written to the entire setting into "True".

The job ticket generated by the print data editing device 110 of the host computer 100 (information processing apparatus) as shown in FIG. 7 is provided for the central printing management server 120 at a print instruction from the user to the print data editing device 110. In the central printing management server 120, the print information control unit 121 controls the printing operation by performing the process from the subsequent step S206 based on the job ticket received from the host computer 100.

Step S206:

The print information control unit 121 transmits a job ticket and print data as print information for printer to the print server 130.

Step S207:

The print server 130 performs printing processing based on the job ticket and print data from the central printing management server 120.

Figure 5:
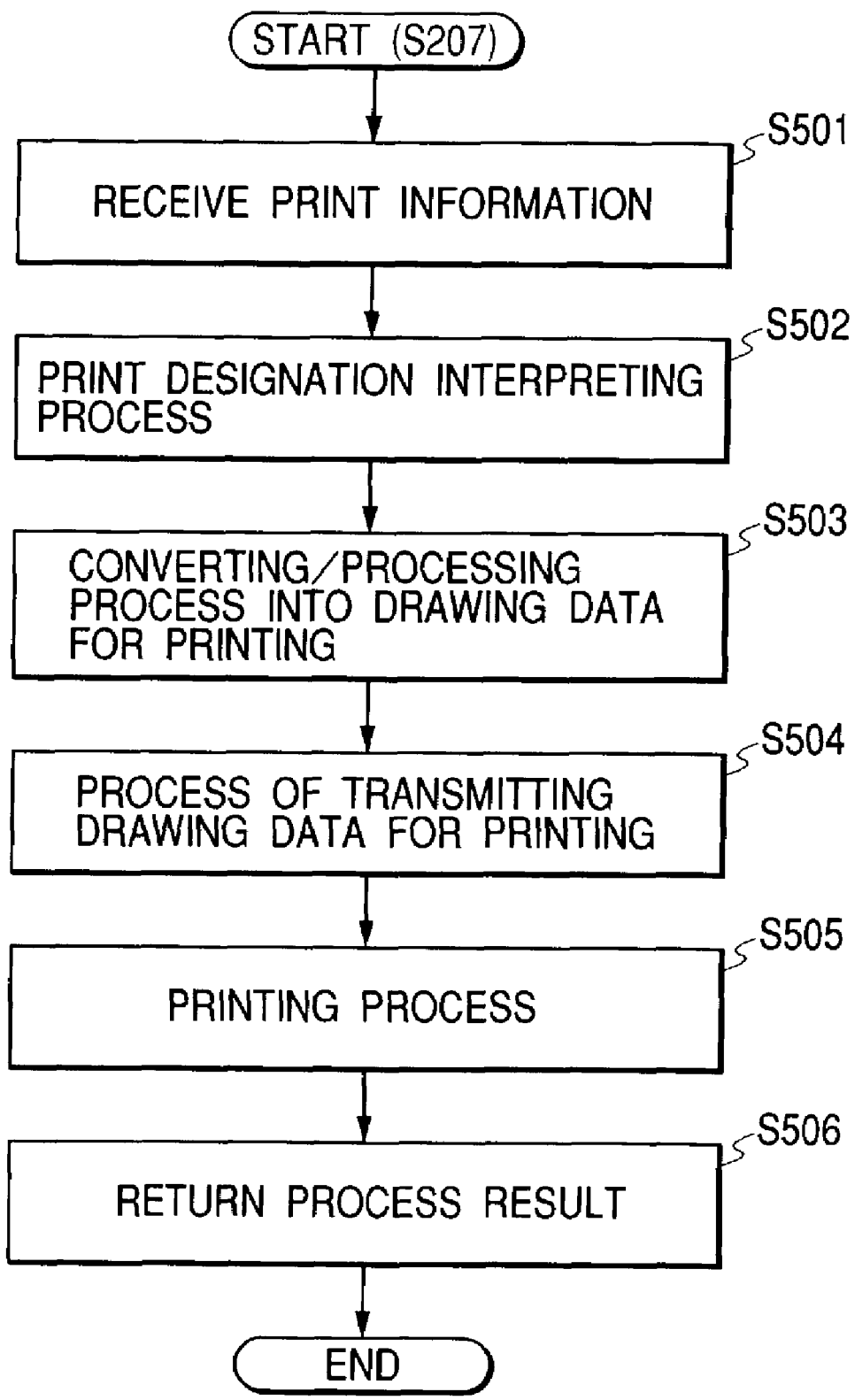
FIG. 5 is a flowchart for explanation of the printing processing of a print server in the operations of the printing system.

Practically, for example, the print server 130 performs the process as shown in FIG. 5 on each output device (printer). FIG. 5 is a flowchart for explanation of the control in the print server 130 (S501 to S504, and S506) and the output device 140 (S505).

That is, first in step S501, the print instruction interpretation unit 132 receives print information from the print information control unit 121. Then, in step S502, the print instruction interpretation unit 132 interprets the job ticket contained in the print information.

Then in step S503, the print information processing unit 133 (corresponding to the printer driver) generates a printing job formed by drawing data for printing and the page description language of the printer control data by converting the print data contained in the print information into the drawing data for printing and performing a handling process based on the interpretation result.

At this time, as shown in FIG. 7, since the print flag of the group of "bugaihi-1" is "True" in the <group designation> in the <entire designation unit> while the print flag of the group of "bugaihi-2" is "False", the printing of the watermark 603 corresponding to "confidential.pdf" of "bugaihi-2" is suppressed. Thus, for the image data for printing on pages 4 to 7 for which the group name "bugaihi-2" of the watermark 603 is set as shown in FIG. 7, the watermark 603 is not reflected as in image data for printing 604 on page 4 as shown in FIG. 6, and the watermark 602 is reflected only by the image data for printing on pages 1 to 3 in which the group name "bugaihi-1" of the watermark 602 is set.

Then, in step S504, the print information transmission unit 134 transmits a printing job formed by the drawing data for printing and the printer control data obtained in step S503 to the output device 140(*x*).

Thus, in the output device 140(*x*), the print information output unit 141 performs the printing processing by the printer which is the output device 140(*x*) based on the drawing data for printing and the printer control data. In step S505, the print server 130 monitors the printing processing status of the output device 140.

Then, in step S506, in the print server 130, the output unit information obtaining unit 131 notifies the print information control unit 121 of the central printing management server 120 of the information about the printing result by the output device 140(*x*). The printing result refers to the print log information about the normal termination of printing processing, and includes the information about the printing range, the number of print sets, the staple, the print device information, etc.

Steps S208 to S210:

In step S208, the print information control unit 121 in the central printing management server 120 of the host computer 100 obtains the printing result information notified by the output unit information obtaining unit 131 of the print server 130. Then, in step S209, the job ticket editing unit 122 adds the printing result information received from the print information control unit 121 to the job ticket. In step S210, the print information control unit 121 stores in the print information storage unit 152 of the document management server 150 of the host computer 100 the job ticket added by the job ticket editing unit together with the print data as the print information (a set of print data and a job ticket), thereby terminating the process.

FIG. 8 shows an example of a job ticket when there is no trouble detected in a printing result. The job ticket describes the above-mentioned print log information in the recording unit.

As described above, according to the first embodiment, the link information, the group name, the print flag of the additional drawing object are described in the entire setting area of the job ticket describing the print settings of the print data, and the group name is described in the setting area of each print unit (chapter, sheet, page). Thus, when a plurality of additional drawing objects are added to a document, additional drawing objects to be printed and not to be printed can only be specified only by rewriting the print flag for the entire setting area, thereby possibly updating, changing, amending, etc. only the additional drawing objects. Thus, it is not necessary to determine whether or not an additional drawing object is to be printed each time printing processing is performed, thereby improving the operability.

Furthermore, since a job ticket is constructed to hold an instruction (group name) to add an additional drawing object for each unit (for example, a page) in which an additional drawing object is to be added, the additional drawing object (added information) can be dynamically added to a manuscript page.

Second Embodiment

As described above, the first embodiment is described as a system in which the link information, the group name, the print flag of the additional drawing object are described in the entire setting area of the job ticket, and the group name is described in the setting area of each print unit (chapter, sheet, page).

The second embodiment is described as a system in which whether or not an additional drawing object is to be printed for the entire document is set, and whether or not the additional drawing object is to be printed as an exceptional setting is set independent of the setting for the entire document, depending on which a job ticket is generated. That is, in the second embodiment, as in the first embodiment, a watermark is used as an additional drawing object in the printing system 100 shown in FIG. 1, and the printer connected to the network performs the printing processing with the settings made for collective group printing and printability for each page.

According to the present embodiment, for example, after setting "printable" for collective group printing for the entire document, "not printable" is set to negate "collective group printing" for each page as an exceptional setting for the print data on pages 2 to 5, thereby suppressing the printing of a watermark as described below.

The operations of the printing system 100 according to the present embodiment are described below by referring to FIGS. 1 to 3, 5, 9, and 10.

Step S201: Refer to FIG. 2.

In the print data editing device 110 of the host computer 100, the print information input unit 111 inputs information to be printed from an arbitrary application, and converts the format, thereby inputting print data and a print instruction.

As print data, for example, data in accordance with the PDF (Portable Document Format) is applicable. A print instruction can be, for example, the number of print sets, the form size, various finishing processes, simplex/duplex, N-Up, enlargement/reduction, print page designation, etc.

Step S202:

The drawing object addition setting unit 115 inputs an additional drawing object at the designation of a user.

Figure 10:
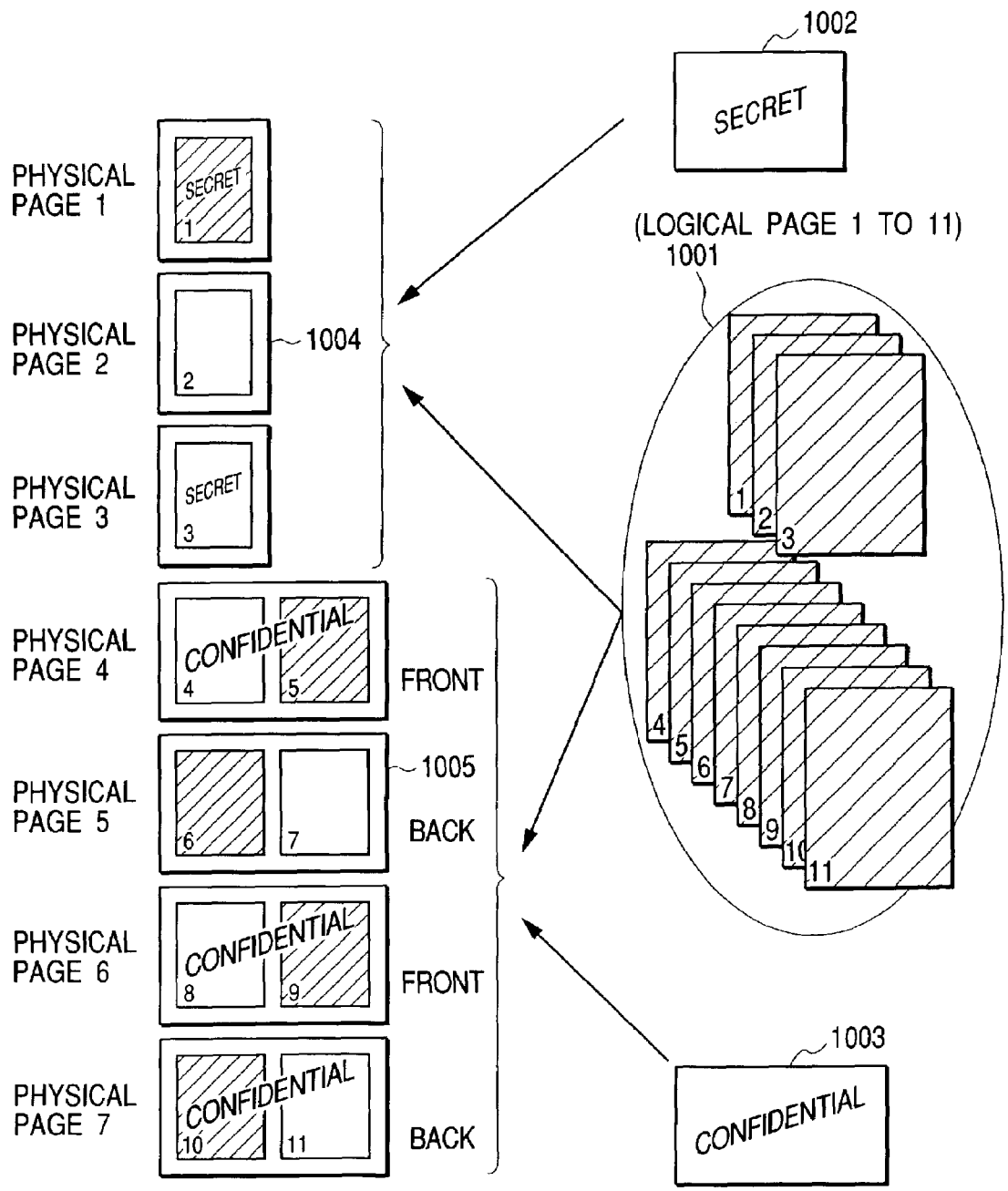
FIG. 10 is an explanatory view of an example of input data and an output result in the printing system in a second embodiment.

Practically, for example, a watermark 1002 of "Secret" and a watermark 1003 of "Confidential" as shown in FIG. 10 are used as additional drawing objects. Like print data 1001 (in this example, print data on pages 1 to 11) for each page, these watermarks 1002 and 1003 are generated as a different image file in advance, and inserted in each print area of each image data for printing.

It is assumed that a job ticket holds only a link to a file.

Step S203:

The additional drawing object group setting unit 112 sets the group name of the additional drawing object input by the drawing object addition setting unit 115.

Step S204:

The additional drawing object printability setting unit 113 sets the printability of each group and each page of the additional drawing objects set by the additional drawing object group setting unit 112.

A plurality of additional drawing objects can be input by changing the group name of an additional drawing object by the additional drawing object group setting unit 112.

Step S205:

By performing the process shown in FIG. 3, the job ticket generation unit 114 generates a job ticket according to the print instruction (number of print sets, form size, staple, color printing, simplex/duplex printing, N-Up, enlargement/reduction, printing page designation, etc.) input by the print information input unit 111 and the information about the additional drawing object (watermark, annotation, stamp, etc.) input by the drawing object addition setting unit 115.

Figure 9:
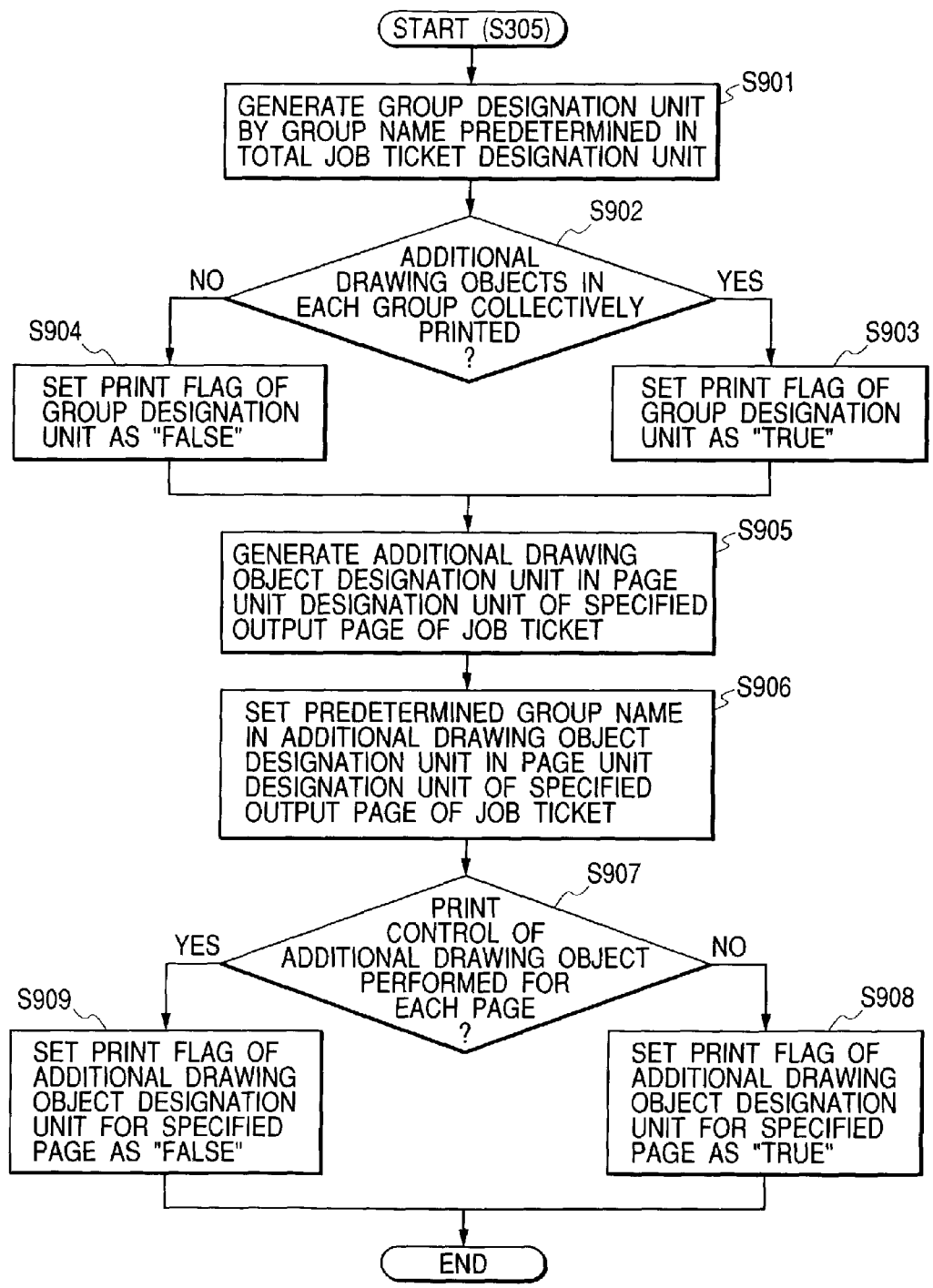
FIG. 9 is a flowchart for explanation of an additional drawing object relevant information setting process in the job ticket generating process in a second embodiment.

According to the present embodiment, the additional drawing object relevant information setting process in step S305 shown in FIG. 3 is, for example, defined as the process as shown in FIG. 9.

First, in step S901, the job ticket generation unit 114 generates a <group designation unit> under an <entire designation unit> which is an entire setting area of a job ticket using a group name ("bugaihi-1", etc.) set in advance by the additional drawing object group setting unit 112 as shown in FIG. 11.

Next, in step S902, the job ticket generation unit 114 determines whether or not additional drawing objects are collectively printed for each group according to the printability for each group of the additional drawing objects set in advance by the additional drawing object printability setting unit 113. If it is determined that the collective printing is not to be performed, then the process in step S904 is performed. If it is determined that the collective printing is to be performed, then process is passed to perform the process in step S903.

For example, when additional drawing objects of a target group are collectively printed, the job ticket generation unit 114 sets "True" for the print flag (the print flag of the <group designation unit> of the job ticket) corresponding to the target group in step S903 as shown in FIG. 11.

If additional drawing objects of a target group are not printed, the job ticket generation unit 114 sets "False" for the print flag (the print flag of the <group designation unit> of the job ticket) corresponding to the target group in step S904 as shown in FIG. 11.

In step S905 after the process in step S903 or S904, the job ticket generation unit 114 generates an <additional object designation unit> for a  (corresponding to a setting area of each print unit (page in this example)) of the printout page specified by a job ticket as shown in FIG. 11.

In step S906, the job ticket generation unit 114 sets the group name used in step S901 for the <additional drawing object designation unit> generated in step S905 as shown in FIG. 11.

Thus, the target group can be associated with the additional drawing object.

In step S907, the job ticket generation unit 114 determines whether or not an additional drawing object is to be printed for each page depending on the printability of each page of the additional drawing object set in advance by the additional drawing object printability setting unit 113. If it is determined that the additional drawing object is not printed for each page, process is passed to step S908. If it is determined that the additional drawing object is printed for each page, process is passed to step S909.

For example, when printing the additional drawing object in a page unit is suppressed, the job ticket generation unit 114 sets "False" for the print flag of the <additional object designation unit> (corresponding to the setting area of each print unit (page in this example)) of the  of the job ticket as shown in FIG. 11 in step S909.

On the other hand, when printing the additional drawing object in a page unit is not suppressed, the job ticket generation unit 114 sets "True" for the print flag of the <additional object designation unit> (corresponding to the setting area of each print unit (page in this example)) of the  of the job ticket as shown in FIG. 11 in step S908. It is assumed that the processes in steps S908 and S909 are performed for each page.

In the present embodiment, since the printing processing of the additional drawing objects is suppressed on the print data on pages 2 and 5, "False" is set for the print flag of the setting area in a page unit corresponding to the pages on which the printing processing of the additional drawing objects is suppressed as shown in FIG. 11, and "True" is set for the print flag of the setting area in a page unit corresponding to the pages on which the additional drawing objects are to be printed.

Based on the result of the job ticket generating process in step S205 as described above, the job ticket as shown in FIG. 11 is obtained.

FIG. 11 shows an example of a part of the job ticket used when a setting result of the additional drawing object relevant information and a print instruction are set in the XML system, but other appropriate methods can also be applied. A link is shown with each file name only.

For each page in chapter 2, two pieces of <contents information> are set, that is, the state (2 up) is set that two logical pages are arranged in one physical page. Practically, in FIG. 10, relating to pages 4 to 11 of the manuscript (that is, logical pages), page 1 of chapter 2 of the drawing data for printing, that is, "physical page 4" corresponds to the logical pages 4 and 5, page 2 of chapter 2, that is "physical page 5" corresponds to the logical pages 6 and 7, page 3 of chapter 2, that is, "physical page 6" corresponds to the logical pages 8 and 9, and page 4 of chapter 2, that is, "physical page 7" corresponds to the logical pages 10 and 11 are arranged respectively. As shown in FIG. 11, the job ticket generation unit 114 writes the group name of an additional drawing object and a print flag (flag indicating whether or not a drawing is to be added) corresponding to a target group and the link information about the additional drawing object to the entire setting of the job ticket, and writes the group name of the additional drawing object and the print flag to a predetermined unit setting area (the page setting area in this example) of the target printout page at the additional drawing object designation from the drawing object addition setting unit 115. Thus, for example, in the case of an annotation, if the annotation is displayed when the manuscript of print data is displayed in the application on the host computer 100, and the annotation is not printed during printing, then the above-mentioned job ticket is generated. Thus, the added object is not printed if the print flag corresponding to the target group of the additional drawing object written to the entire setting of the job ticket is described as "False" (it is obvious that 0 or 1 can be set). Therefore, a user-desired printing result can be easily obtained. If added drawing object is to be printed for the entire document, then it can be realized only by changing the print flag of the target group written to the entire setting into "True". When a desired print unit is selected for each predetermined unit, a print flag of a setting area in a predetermined unit (for example, a page unit) is to be changed into "True" to obtain a desired printing result.

The job ticket generated by the print data editing device 110 (also called a print data editing unit) of the host computer 100 as shown in FIG. 11 is provided for the central printing management server 120 (also called a print management unit) of the host computer 100.

In the central printing management server 120, the print information control unit 121 controls the printing operation by performing the process from the subsequent step S206 based on the job ticket received from the job ticket generation unit 114 of the print data editing device 110.

Step S206:

The print information control unit 121 transmits a job ticket and print data as print information for printer to the print server 130.

Step S207:

The print server 130 performs printing processing, such as shown in FIG. 5, based on the job ticket and print data from the central printing management server 120.

That is, first in step S501, the print instruction interpretation unit 132 receives print information. Then, in step S502, the print instruction interpretation unit 132 interprets the job ticket contained in the print information.

Then in step S503, the print information processing unit 133 generates a drawing data for printing and a printer control data by converting the print data contained in the print information into the drawing data for printing and performing a handling process based on the interpretation result.

At this time, as shown in FIG. 11, since the collective printing is designated for the entire document, the print flag of each of the groups "bugaihi-1" and "bugaihi-2" is set "True" in the <group designation> in the <entire designation unit>, which is the entire setting area of a job ticket. However, since no-printing is specified as an exceptional setting on the des-ignation of the entire document, the print flag is set "False" in the <additional object designation> in , which is a setting area in a predetermined unit corresponding to the output page (that is, physical page) 2 and 5 (corresponds to the page the logical pages 6 and 7 are arranged). Therefore, as shown in FIG. 10, the printing of watermarks 1002 and 1003 corresponding to print data 1004 and 1005 on physical pages 2 and 5 is suppressed, and the watermarks 1002 and 1003 are reflected on other pages.

Then, in step S504, the print information transmission unit 134 transmits the drawing data for printing and the printer control data obtained in step S503 to the output device 140(x).

Thus, in the output device 140(x), the print information output unit 141 performs the printing processing by the printer which is the output device 140(x) based on the drawing data for printing and the printer control data. In step S505, the print server 130 monitors the printing processing status of the output device 140.

Then, in step S506, in the print server 130, the output unit information obtaining unit 131 notifies the print information control unit 121 of the central printing management server 120 of the information about the printing result by the output device 140(x). The printing result refers to the print log information about the normal termination of printing, and includes the information about the printing range, the number of print sets, the staple, the print device information, etc.

Steps S208 to S210:

In step S208, the print information control unit 121 in the central printing management server 120 of the host computer 100 obtains the printing result information notified from the print server 130. Then, in step S209, the print information control unit 121 transmits the printing result information to the job ticket editing unit 122, the job ticket editing unit 122 adds the printing result information to the job ticket. In step S210, the print information control unit 121 stores in the print information storage unit 152 of the document management server 150 the job ticket added together with the print data as the print information (a set of print data and a job ticket), thereby terminating the process.

FIG. 12 shows an example of a job ticket when there is no trouble detected in a printing result.

As described above, according to the second embodiment, the link information, the group name, the print flag of the additional drawing object are described in the entire setting area of the job ticket describing the print settings of the print data, and the group name and a print flag are described in the setting area of each logical page unit. Thus, when an additional drawing objects is added to a document, additional drawing objects to be printed and not to be printed can only be specified only by rewriting the print flag for the entire setting area. Furthermore, regardless of the print settings of the additional drawing object on the entire document on each page, the printing can be set to further print the additional drawing objects as exceptional settings in a logical page unit. Thus, independent of the printability of the additional drawing object on the entire document, the printability of the additional drawing objects can be switched in a logical page unit, thereby the effect is obtained that improving the flexibility in representing an additional drawing object.

Third Embodiment

In the above-mentioned second embodiment, the system is described in which generates the job ticket allowing whether or not the additional drawing object is to be printed on the entire document is set, and whether or not the additional drawing object can be set in a logical page unit as an exceptional setting based on the exceptional setting in the entire setting and the logical page unit.

In the third embodiment, a system is described in which whether or not the additional drawing object can be printed for the entire document is set, and the logical page and the physical page of the arrangement target area of the additional drawing object can be switched by generating a job ticket based on the entire setting and the arrangement target area in the logical page unit/physical page unit.

That is, according to the third embodiment, in the print system 100 shown in FIG. 1, a system is described in which two types of additional drawing objects, that is, a logical page annotation and a physical page annotation as additional drawing object, are used in performing printing processing by the output device 140(*x*) used as a printer connected to a network, and collective group printing can also be set.

The operations of the printing system 100 according to the present embodiment are described below by referring to FIGS. 1 to 5, 13, and 14.

Step S201: Refer to FIG. 2.

In the print data editing device 110 of the host computer 100, the print information input unit 111 inputs print data and a print instruction as print information.

As print data, for example, data in accordance with the PDF (Portable Document Format) is applicable. A print instruction can be, for example, the number of print sets, the form size, various finishing processes, simplex/duplex, N-Up, enlargement/reduction, print page designation, etc.

Step S202:

The drawing object addition setting unit 115 of the host computer 100 inputs an additional drawing object at the designation of a user.

Figure 14:
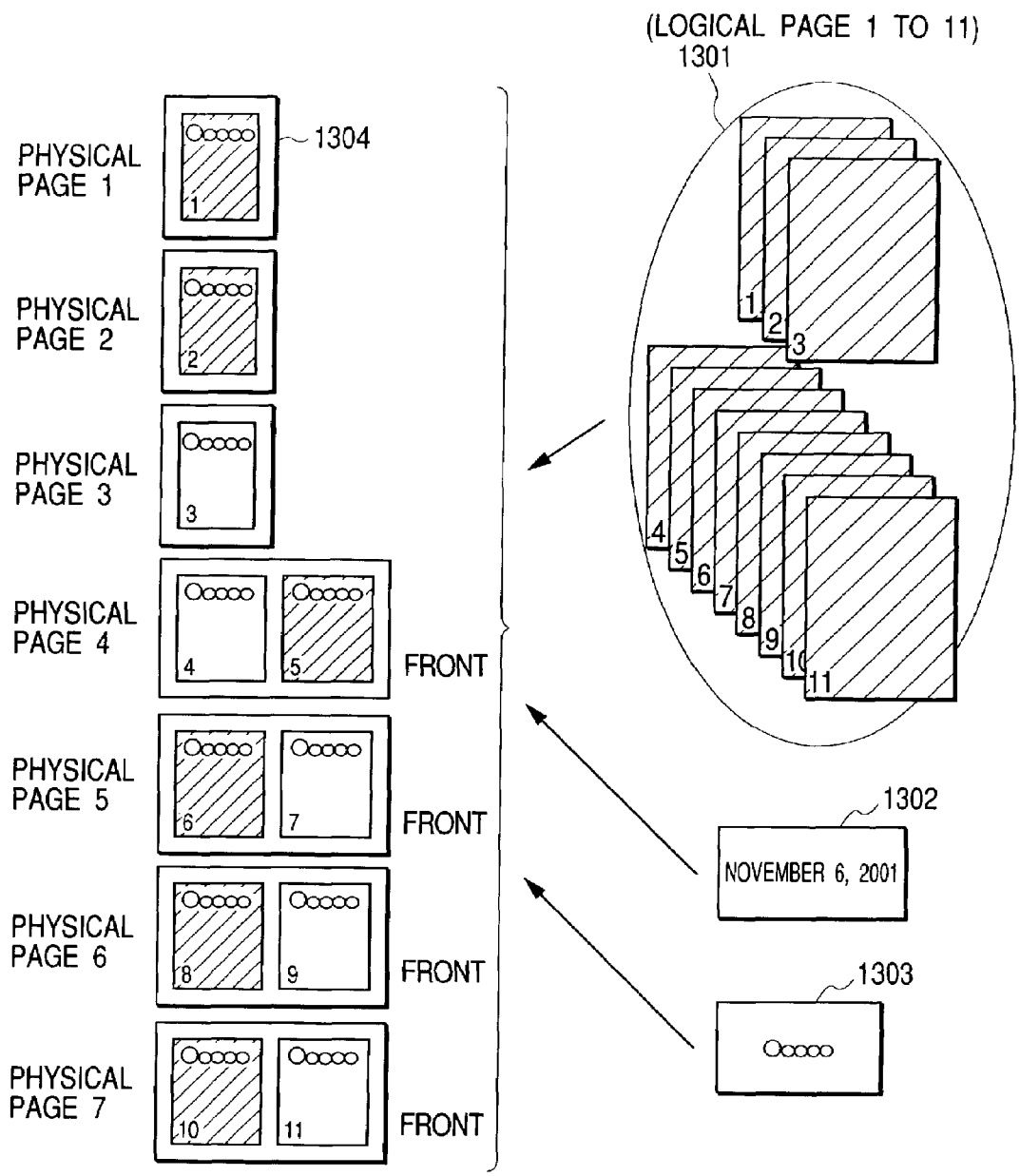
FIG. 14 is an explanatory view of an example of input data and an output result in the printing system in a third embodiment.

Practically, for example, a physical page annotation 1302 and a logical page annotation 1303 as shown in FIG. 14 are used as additional drawing objects. Like print data 1301 (in this example, print data on pages 1 to 11) for each page, these physical page annotation 1302 and logical page annotation 1303 are generated as different image files in advance.

The physical page annotation 1302 is an annotation (physical page annotation) inserted as "Nov. 6, 2001" in the physical page area corresponding to an output sheet.

The logical page annotation 1303 is an annotation (logical page annotation) inserted as "Ooooo" in the logical page area corresponding to manuscript data.

It is assumed that a job ticket holds only a link to a file.

Step S203:

The additional drawing object group setting unit 112 sets the group name and an arrangement target area of the additional drawing object input by the drawing object addition setting unit 115.

Step S204:

The additional drawing object printability setting unit 113 sets the printability of each group of the additional drawing objects set by the additional drawing object group setting unit 112.

A plurality of additional drawing objects can be input by changing the group name of an additional drawing object by the additional drawing object group setting unit 112.

Step S205:

The job ticket generation unit 114 generates a job ticket according to the print instruction (number of print sets, form size, staple, color printing, simplex/duplex printing, N-Up, enlargement/reduction, printing page designation, etc.) input by the print information input unit 111 and the information about the additional drawing object input by the drawing object addition setting unit 115.

Practically, for example, first in step S301 as shown in FIG. 3, the job ticket generation unit 114 sets in a job ticket the N-Up, the enlargement/reduction, the form size, or the information about the layout such as simplex/duplex printing, etc. (layout setting process). In step S302, the job ticket generation unit 114 performs the settings for the number of print sets (number-of-print-sets setting process). Then, in step S303, the job ticket generation unit 114 sets the print page range in the job ticket (print page range designating process). In step S304, the job ticket generation unit 114 sets the staple information in the job ticket (staple setting process). Then, in step S305, the job ticket generation unit 114 sets the information about the additional drawing object (additional drawing object relevant information setting process).

Figure 13:
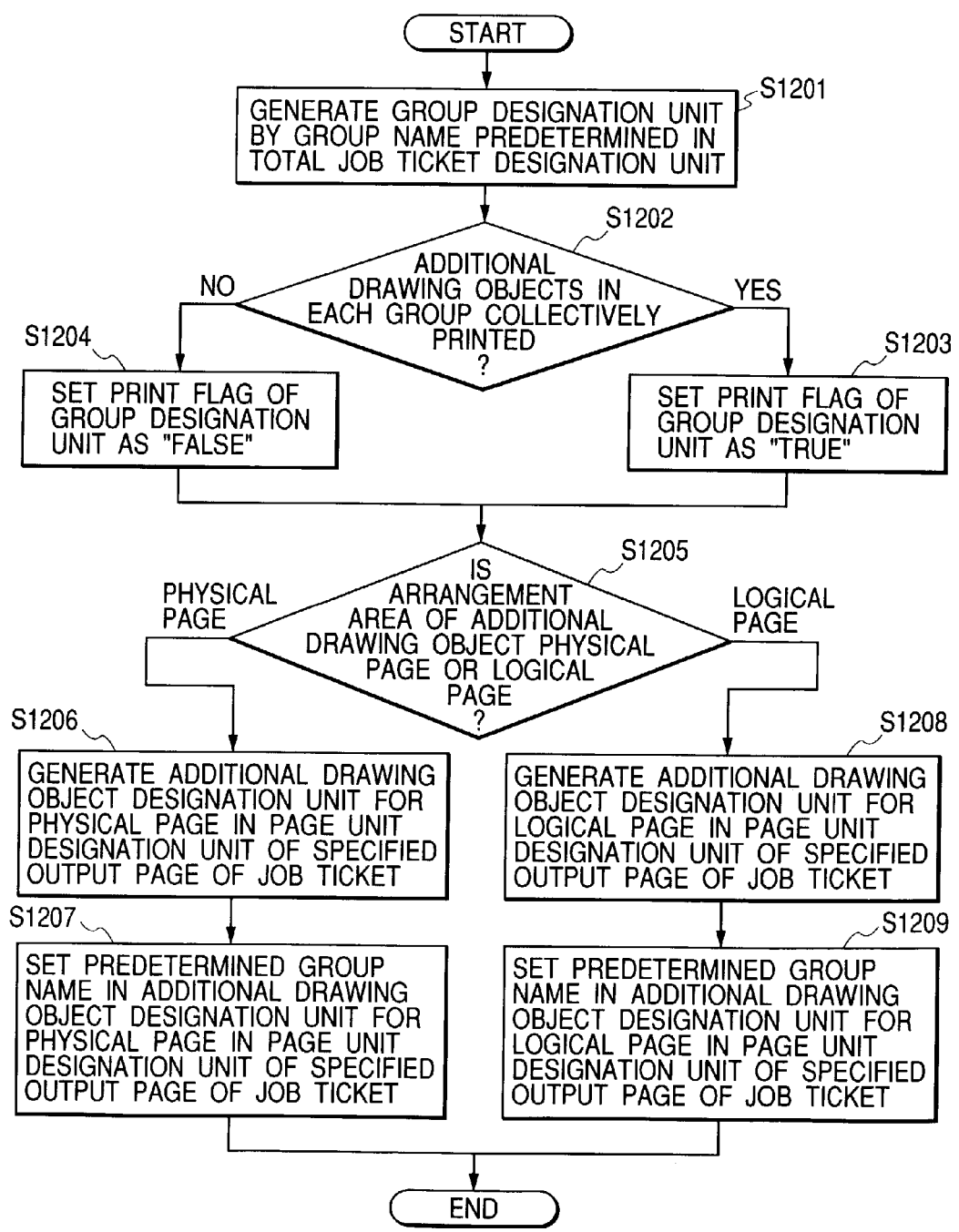
FIG. 13 is a flowchart for explanation of an additional drawing object relevant information setting process in the job ticket generating process in a third embodiment.

In the present embodiment, the additional drawing object relevant information setting process in step S305 is assumes to be a process in accordance with the flowchart shown in FIG. 13.

That is, first in step S1201, the job ticket generation unit 114, for example, generates a <group designation unit> under an <entire designation unit> which is an entire setting area of a job ticket using a group name ("annotation-1", etc.) set in advance by the additional drawing object group setting unit 112 as shown in FIG. 15.

Next, in step S1202, the job ticket generation unit 114 determines whether or not additional drawing objects are collectively printed for each group according to the printability for each group of the additional drawing objects set in advance by the additional drawing object printability setting unit 113. If it is determined that the collective printing is to be performed, then the process in step S1203 is performed. If it is determined that the collective printing is not to be performed, then the process in step S1204 is performed.

For example, when additional drawing objects of a target group are collectively printed, the job ticket generation unit 114 sets "True" for the print flag (the print flag of the <group designation unit> of the job ticket) corresponding to the target group in step S1203 as shown in FIG. 15.

If additional drawing objects of a target group are not printed, the job ticket generation unit 114 sets "False" for the print flag (the print flag of the <group designation unit> of the job ticket) corresponding to the target group in step S1204 as shown in FIG. 15.

In step S1205, the job ticket generation unit 114 determines whether the arrangement target area of the additional drawing object is a logical page or a physical page depending on the arrangement target area predetermined by the additional drawing object group setting unit 112. If it is determined that the arrangement target area is a physical page, process is passed to step S1206. If it is determined that the arrangement target area is a logical page, then process is passed to step S1208.

For example, if the arrangement target area of the additional drawing object is a printout sheet, that is, a physical page, then the job ticket generation unit 114 generates an <additional drawing object designation unit for physical page> which is a physical page setting area for the  of the output page for which a job ticket is specified in step S1206 as shown in FIG. 15. Then, in step S1207, the job ticket generation unit 114 sets the group name used in step S1201 also in the <additional drawing object designation unit for physical page>. Thus, the target group can be associated with the additional drawing object.

On the other hand, if the arrangement target area of the additional drawing object is a manuscript area, that is, the logical page, then the job ticket generation unit 114 generates an <additional drawing object designation unit for logical page> which is a logical page setting area for the  of the output page for which a job ticket is specified in step S1208 as shown in FIG. 15. At this time, the job ticket generation unit 114 can hold the ID of the contents information which is an arrangement target area as a contents ID for the <additional drawing object designation unit for a logical page> by assigning an ID when the contents information is set in the job ticket in advance. Thus, the additional drawing object for a logical page can be associated with the contents information which is an arrangement target area.

Furthermore, in step S1209, the job ticket generation unit 114 sets the group name used in step S1201 also in the <additional drawing object designation unit for a logical page>. Thus, the target group can be associated with the additional drawing object.

Based on the result of the job ticket generating process in step S205 as described above, the job ticket as shown in FIG. 15 is obtained.

FIG. 15 shows an example of a part of the job ticket used when a setting result of the additional drawing object relevant information and a print instruction are set in the XML system, but other appropriate methods can also be applied. A link is shown with each file name only.

For each page in chapter 2, two pieces of <contents information> are set, that is, the status (2 up) is set that two logical pages are arranged in one physical page. Practically, in FIG. 14, relating to pages 4 to 11 of the manuscript (that is, logical pages), page 1 of chapter 2 of the drawing data for printing, that is, "physical page 4" corresponds to the logical pages 4 and 5, page 2 of chapter 2, that is "physical page 5" corresponds to the logical pages 6 and 7, page 3 of chapter 2, that is, "physical page 6" corresponds to the logical pages 8 and 9, and page 4 of chapter 2, that is, "physical page 7" corresponds to the logical pages 10 and 11 are arranged respectively.

The job ticket generated by the print data editing device 110 (a print data editing unit) of the host computer 100 as shown in FIG. 15 is provided for the central printing management server 120 (a central print management unit). In the central printing management server 120, the print information control unit 121 controls the printing operation by performing the process from the subsequent step S206 based on the job ticket received from the job ticket generation unit 114 of the print data editing device 110.

Step S206:

The print information control unit 121 transmits a job ticket and print data as print information for printing to the print server 130.

Step S207:

The print server 130 performs printing processing such as shown in FIG. 5 based on the job ticket and print data from the central printing management server 120.

That is, first in step S501, the print instruction interpretation unit 132 receives print information from the print information control unit 121 of the host computer 100. Then, in step S502, the print instruction interpretation unit 132 interprets the job ticket contained in the print information.

Then in step S503, the print information processing unit 133 generates a drawing data for printing and a printer control data by converting the print data contained in the print information into the drawing data for printing and performing a handling process based on the interpretation result.

At this time, as shown in FIG. 15, the print flag of the group "annotation-1" is "False" in the <group designation> in the <entire designation unit>. However, the print flag of the group "annotation-2" is "True". Therefore, only the printing of the physical page annotation of "Nov. 6, 2001" (hizuke.pdf) is suppressed. Therefore, the image data for printing is not affected.

That is, in this case, as shown in FIG. 14, the physical page annotation of "Nov. 6, 2001" is reflected nowhere. And the logical page annotation of "Ooooo" is reflected on the print areas of all logical pages.

Then, in step S504, the print information transmission unit 134 transmits the drawing data for printing and the printer control data obtained in step S503 to the output device 140(*x*).

Thus, in the output device 140(*x*), the print information output unit 141 performs the printing processing by the printer which is the output device 140(*x*) based on the drawing data for printing and the printer control data. In step S505, the print server 130 monitors the printing processing status of the output device 140.

Then, in step S506, in the print server 130, the output unit information obtaining unit 131 notifies the print information control unit 121 of the central printing management server 120 of the information about the printing result by the output device 140(*x*). The printing result refers to the print log information about the normal termination of printing, and includes the information about the printing range, the number of print sets, the staple, the print device information, etc.

Steps S208 to S210:

In step S208, the print information control unit 121 in the central printing management server 120 obtains the printing result information notified from the print server 130. Then, in step S209, the print information control unit 121 transmits the printing result information to the job ticket editing unit 122, the job ticket editing unit 122 adds the printing result information to the job ticket. In step S210, the print information control unit 121 stores in the print information storage unit 152 of the document management server 150 the job ticket added by the job ticket editing unit together with the print data as the print information (a set of print data and a job ticket) (step S210), thereby terminating the process.

FIG. 16 shows an example of a job ticket when there is no trouble detected in a printing result.

As described above, according to the third embodiment, the link information, the group name, the print flag of the additional drawing object are described in the entire setting area of the job ticket describing the print settings of the print data, the setting area of a logical page unit and the setting area of a physical page unit are provided in the job ticket, and the group name is described in each setting area. Thus, when an additional drawing objects is added to a document, additional drawing objects to be printed and not to be printed can only be specified only by rewriting the print flag for the entire setting area. Furthermore, the arrangement target area of the additional drawing object can be set in a logical page unit or a physical page unit. Thus, the description in the job ticket easily realizes the arrangement of the additional drawing objects on a logical page and a physical page without directly adding an additional drawing object to a document, thereby allowing a user to more flexibly represent additional drawing objects.

Fourth Embodiment

As described above, according to the third embodiment, the system is described in which generates the job ticket allowing whether or not an additional drawing object is printed for the entire document can be set, and whether the additional drawing object is to be drawn in a logical page unit or a physical page unit can be set based on the entire setting and the settings in a logical page unit or a physical page unit.

In the fourth embodiment of the present invention, a system is described in which generates a job ticket allowing whether or not an additional drawing object is printed for the entire document is set, and whether or not the additional drawing object can be set in a logical page unit or a physical page unit as an exceptional setting can be set based on the entire setting and the settings in a logical page unit as an exceptional setting. In the printing system 100 shown in FIG. 1, as in the third embodiment, using two types of additional drawing objects of the logical page annotation and the physical page annotation as additional drawing objects, and using the output device 140(x) as a printer connected in the network, the printer performs printing processing, and whether or not collective group printing is to be performed is set. However, relating to page 4 of the physical page and pages 10 and 11 of the logical page, setting "no-printing" to negate the "collective group printing" for each page suppresses the printing of the logical page annotation and the physical page annotation.

The operations of the printing system 100 according to the present embodiment are described below by referring to FIGS. 1 to 5, 17A, 17B and 18.

Step S201: Refer to FIG. 2.

In the print data editing device 110 of the host computer 100, the print information input unit 111 inputs print data and a print instruction as print information.

As print data, for example, data in accordance with the PDF (Portable Document Format) is applicable. A print instruction can be, for example, the number of print sets, the form size, various finishing processes, simplex/duplex, N-Up, enlargement/reduction, print page designation, etc.

Step S202:

The drawing object addition setting unit 115 inputs an additional drawing object at the designation of a user.

Figure 18:
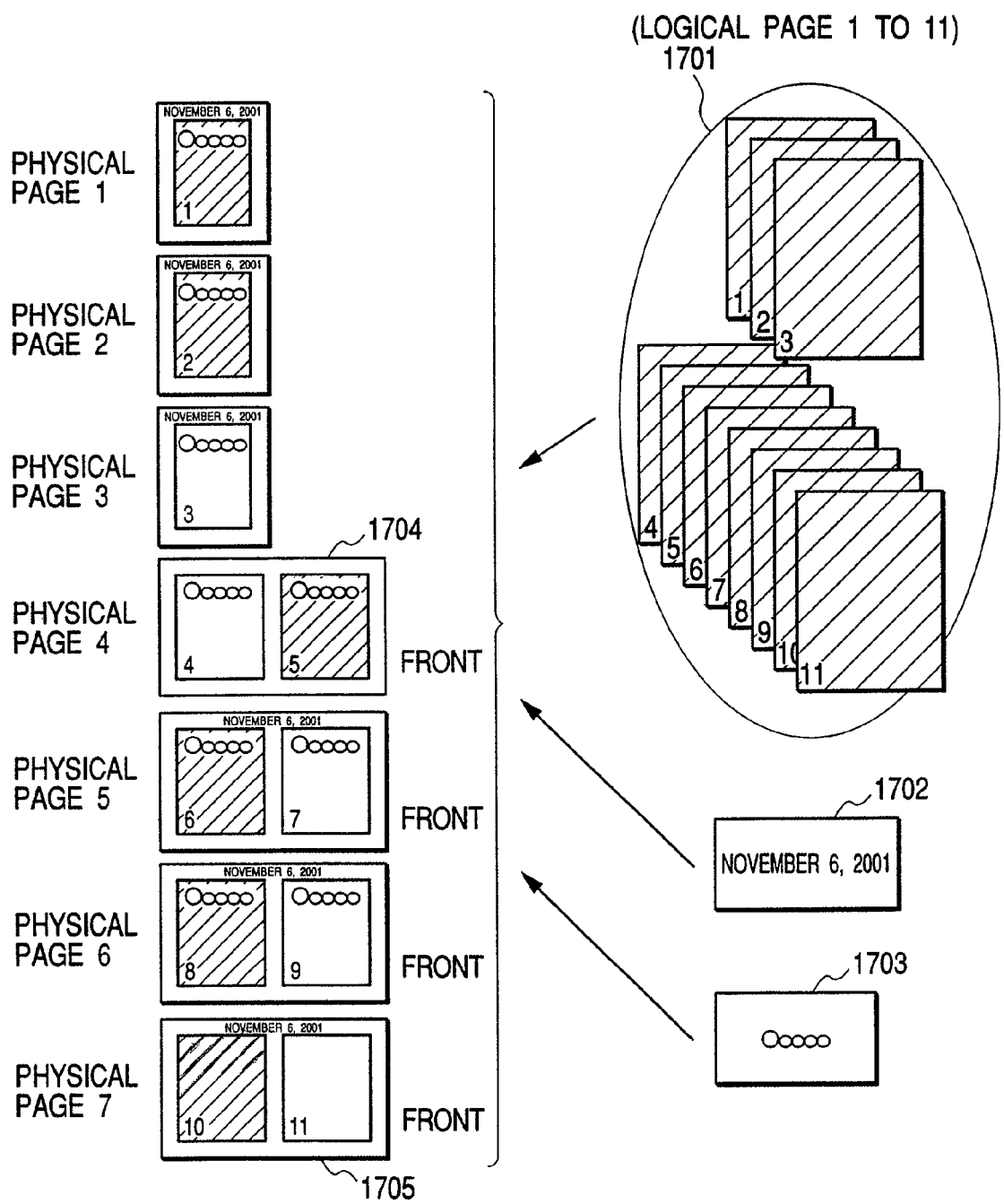
FIG. 18 is an explanatory view of an example of input data and an output result in the printing system in a fourth embodiment.

Practically, for example, a physical page annotation 1702 and a logical page annotation 1703 as shown in FIG. 18 are used as additional drawing objects. Like print data 1701 (in this example, print data on pages 1 to 11) for each page, these physical page annotation 1702 and logical page annotation 1703 are generated as different image files in advance, and is inserted in each print area for each piece of image data for printing.

The physical page annotation 1702 is an annotation (physical page annotation) inserted as "Nov. 6, 2001" in the physical page area corresponding to an output sheet.

The logical page annotation 1703 is an annotation (logical page annotation) inserted as "Ooooo" in the logical page area corresponding to manuscript data.

It is assumed that a job ticket holds only a link to a file.

Step S203:

The additional drawing object group setting unit 112 sets the group name and an arrangement target area of the additional drawing object input by the drawing object addition setting unit 115.

Step S204:

The additional drawing object printability setting unit 113 sets the printability of each group of the additional drawing objects set by the additional drawing object group setting unit 112.

A plurality of additional drawing objects can be input by changing the group name of an additional drawing object by the additional drawing object group setting unit 112.

Step S205:

The job ticket generation unit 114 generates a job ticket according to the print instruction (number of print sets, form size, staple, color printing, simplex/duplex printing, N-Up, enlargement/reduction, printing page designation, etc.) input by the print information input unit 111 and the information about the additional drawing object.

Practically, for example, first in step S301 as shown in FIG. 3, the job ticket generation unit 114 sets in a job ticket the N-Up, the enlargement/reduction, the form size, or the information about the layout such as simplex/duplex printing, etc. (layout setting process). In step S302, the job ticket generation unit 114 performs the settings for the number of print sets in the job ticket (number-of-print-sets setting process). Then, in step S303, the job ticket generation unit 114 sets the print page range in the job ticket (print page range designating process). In step S304, the job ticket generation unit 114 sets the staple information in the job ticket (staple setting process). Then, in step S305, the job ticket generation unit 114 sets in the job ticket the information about the additional drawing object (additional drawing object relevant information setting process).

Figure 17B:
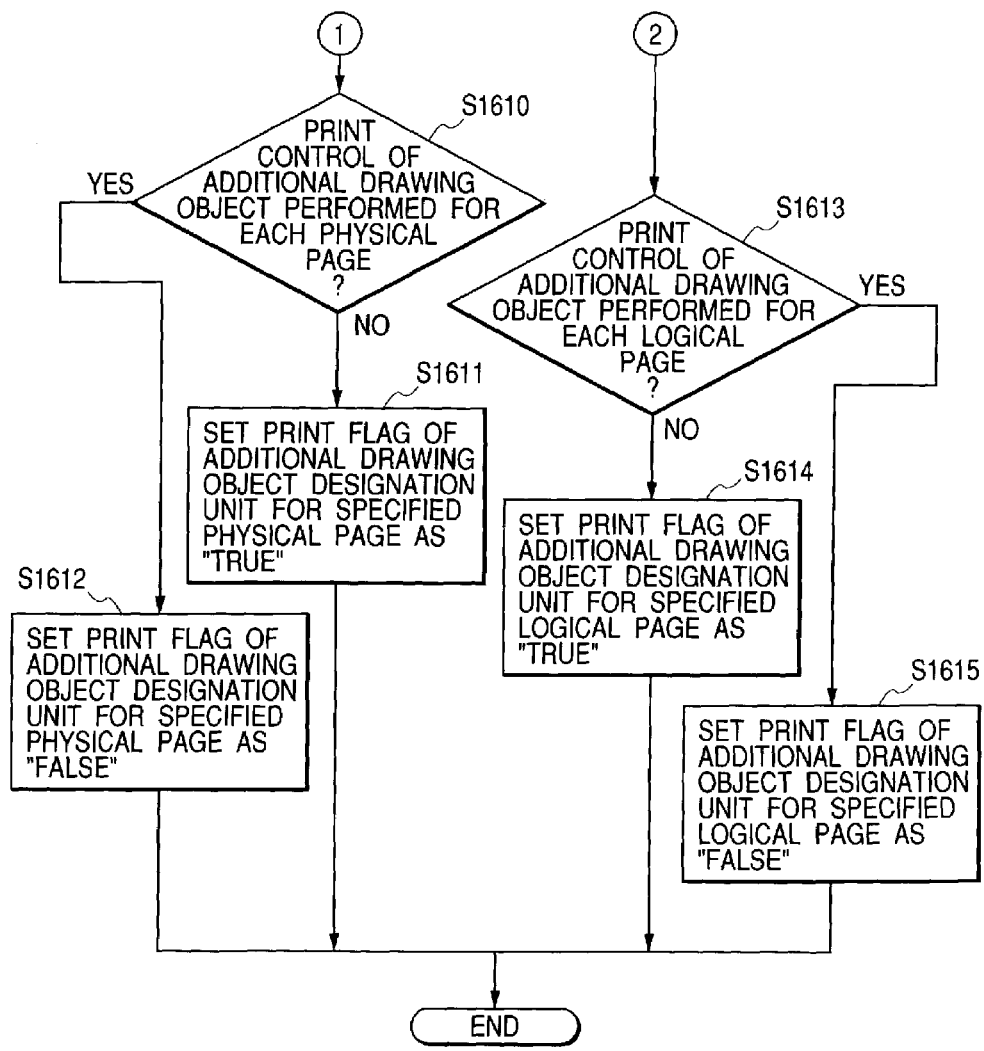
FIG. 17 which comprised of FIGS. 17A and 17B is a flowchart for explanation of an additional drawing object relevant information setting process in the job ticket generating process in a fourth embodiment.

In the present embodiment, the additional drawing object relevant information setting process in step S305 is assumes to be a process in accordance with the flowchart shown in FIGS. 17A and 17B.

That is, first in step S1601, the job ticket generation unit 114, for example, generates a <group designation unit> under an <entire designation unit> which is an entire setting area of a job ticket using a group name ("annotation-1", etc.) set in advance by the additional drawing object group setting unit 112 as shown in FIG. 19.

Next, in step S1602, the job ticket generation unit 114 determines whether or not additional drawing objects are collectively printed for each group according to the printability for each group of the additional drawing objects set in advance by the additional drawing object printability setting unit 113. If it is determined that the collective printing is to be performed, then the process in step S1603 is performed. If it is determined that the collective printing is not to be performed, then the process in step S1604 is performed.

For example, when additional drawing objects of a target group are collectively printed, the job ticket generation unit 114 sets "True" for the print flag (the print flag of the <group designation unit> of the job ticket) corresponding to the target group of the entire setting area in step S1603 as shown in FIG. 19.

If additional drawing objects of a target group are not printed, the job ticket generation unit 114 sets "False" for the print flag (the print flag of the <group designation unit> of the job ticket) corresponding to the target group in step S1604 as shown in FIG. 19.

In step S1605, the job ticket generation unit 114 determines whether the arrangement target area of the additional drawing object is a logical page or a physical page depending on the arrangement target area predetermined by the additional drawing object group setting unit 112. If it is determined that the arrangement target area is a physical page, process is passed to step S1606. If it is determined that the arrangement target area is a logical page, then process is passed to step S1608.

For example, if the arrangement target area of the additional drawing object is a printout sheet, then the job ticket generation unit 114 generates an <additional drawing object designation unit for physical page> for the  (page setting area) of the output page for which a job ticket is specified in step S1606 as shown in FIG. 19. Then, in step S1607, the job ticket generation unit 114 sets the group name used in step S1601 also in the <additional drawing object designation unit for physical page>. Thus, the target group can be associated with the additional drawing object.

Then, the processes from step S1610 described later are performed.

On the other hand, if the arrangement target area of the additional drawing object is a manuscript area, then the job ticket generation unit 114 generates an <additional drawing object designation unit for a logical page> for the  (page setting area) of the output page for which a job ticket is specified in step S1608 as shown in FIG. 19. At this time, the job ticket generation unit 114 can hold the ID of the contents information which is an arrangement target area as a contents ID for the <additional drawing object designation unit for a logical page> by assigning an ID when the contents information is set in the job ticket in advance. Thus, the additional drawing object for a logical page can be associated with the contents information which is an arrangement target area.

Furthermore, in step S1609, the job ticket generation unit 114 sets the group name used in step S1601 also in the <additional drawing object designation unit for a logical page>. Thus, the target group can be associated with the additional drawing object.

Then, the processes from step S1613 described later are performed.

After the process in step S1607 (after the process performed when the arrangement target area of the additional drawing object is a printout sheet, that is, after the process for a physical page), it is determined in step S1610 by the job ticket generation unit 114 whether or not an additional drawing object is printed for each physical page depending on the printability for each page of the additional drawing object predetermined by the additional drawing object printability setting unit 113. If it is determined that the additional drawing object is printed for each physical page, then process is passed to step S1612. If it is determined that the additional drawing object is not printed for each physical page, then process is passed to step S1611.

For example, when the printing of the additional drawing object in a page unit is suppressed, the job ticket generation unit 114 sets "False" for the print flag of the <additional object designation unit for physical page> of the  which is a page setting area of the job ticket in step S1612 as shown in FIG. 19.

On the other hand, when the printing of the additional drawing object in a page unit is not suppressed, the job ticket generation unit 114 sets "True" for the print flag of the <additional object designation unit for physical page> of the  which is a page setting area of the job ticket in step S1611 as shown in FIG. 19.

After the process in step S1609 (after the process performed when the arrangement target area of the additional drawing object is a manuscript area, that is, after the process for a logical page), it is determined in step S1613 by the job ticket generation unit 114 whether or not an additional drawing object is printed for each logical page depending on the printability for each page of the additional drawing object predetermined by the additional drawing object printability setting unit 113. If it is determined that the additional drawing object is printed for each logical page, then process is passed to step S1615. If it is determined that the additional drawing object is not printed for each logical page, then process is passed to step S1614.

For example, when the printing of the additional drawing object in a page unit is suppressed, the job ticket generation unit 114 sets "False" for the print flag of the <additional object designation unit for logical page> of the  which is a page setting area of the job ticket in step S1615 as shown in FIG. 19.

On the other hand, when the printing of the additional drawing object in a page unit is not suppressed, the job ticket generation unit 114 sets "True" for the print flag of the <additional object designation unit for logical page> of the  which is a page setting area of the job ticket in step S1614 as shown in FIG. 19.

In accordance with the result of the job ticket generating process in step S205 described above, the job ticket such as shown in FIG. 19 is to be obtained.

In the embodiment, since the printing of each annotation is suppressed for each page on the physical page 4 and the logical pages 10 and 11, "False" is set for the print flag of the additional drawing object for physical page corresponding to the physical page 4 and the print flag of the additional drawing object for the logical page on the logical pages 10 and 11, and "True" is set for other print flags as shown in FIG. 19.

FIG. 19 shows an example of a part of the job ticket used when a setting result of the additional drawing object relevant information and a print instruction are set in the XML system, but other appropriate methods can also be applied. A link is shown with each file name only.

For each page in chapter 2, two pieces of <contents information> are set, that is, the status (2 up) is set that two logical pages are arranged in one physical page. Practically, in FIG. 14, relating to pages 4 to 11 of the manuscript (that is, logical pages), page 1 of chapter 2 of the drawing data for printing, that is, "physical page 4" corresponds to the logical pages 4 and 5, page 2 of chapter 2, that is "physical page 5" corresponds to the logical pages 6 and 7, page 3 of chapter 2, that is, "physical page 6" corresponds to the logical pages 8 and 9, and page 4 of chapter 2, that is, "physical page 7" corresponds to the logical pages 10 and 11 are arranged respectively.

The job ticket generated by the print data editing device 110 (a print data editing unit) of the host computer 100 as shown in FIG. 19 is provided for the central printing management server 120 (a central print management unit) of the host computer 100.

In the central printing management server 120, the print information control unit 121 controls the printing operation by performing the process from the subsequent step S206 based on the job ticket received from the job ticket generation unit 114 of the print data editing device 110.

Step S206:

The print information control unit 121 transmits a job ticket and print data as print information for printer to the print server 130.

Step S207:

The print server 130 performs printing processing such as shown in FIG. 5 based on the job ticket and print data from the central printing management server 120.

That is, first in step S501, the print instruction interpretation unit 132 receives print information. Then, in step S502, the print instruction interpretation unit 132 interprets the job ticket contained in the print information.

Then in step S503, the print information processing unit 133 which is a printer driver generates a drawing data for printing and a printer control data by converting the print data contained in the print information into the drawing data for printing and performing a handling process based on the interpretation result.

At this time, as shown in FIG. 19, the print flags of each group "annotation-1" and "annotation-2" are both "True" in the <group designation> in the <entire designation unit>. However, in<additional object designation> in , which is a page setting area corresponding to physical page 4 and logical pages 10 to 11, the print flag is "False", therefore, only the printing of the annotation on these pages is suppressed, and the image data for printing is not affected.

That is, as shown in FIG. 18, on the physical page 4 (1704), the printing of the physical page annotation of "Nov. 6, 2001" (hizuke.pdf) is suppressed (1704 shown in FIG. 18). On the logical pages 10 and 11 (1705), the printing of the logical page annotation of "Ooooo" (Ooooo.pdf) is suppressed. Thus, they are not reflected on the image data for printing.

Then, in step S504, the print information transmission unit 134 transmits the drawing data for printing and the printer control data obtained in step S503 to the output device 140(x).

Thus, in the output device 140(x), the print information output unit 141 performs the printing processing by the printer which is the output device 140(x) based on the drawing data for printing and the printer control data. In step S505, the print server 130 monitors the printing processing status of the output device 140.

Then, in step S506, in the print server 130, the output unit information obtaining unit 131 notifies the print information control unit 121 of the central printing management server 120 of the information about the printing result by the output device 140(x) (step S506). The printing result refers to the print log information about the normal termination of printing processing, and includes the information about the printing range, the number of print sets, the staple, the print device information, etc.

Steps S208 to S210:

In step S208, the print information control unit 121 in the central printing management server 120 of the host computer 100 obtains the printing result information notified from the print server 130. Then, in step S209, the print information control unit 121 transmits the printing result information to the job ticket editing unit 122, the job ticket editing unit 122 adds the printing result information to the job ticket. In step S210, the print information control unit 121 stores in the print information storage unit 152 of the document management server 150 the job ticket added together with the print data as the print information (a set of print data and a job ticket), thereby terminating the process.

FIG. 20 shows an example of a job ticket when there is no trouble detected in a printing result.

As described above, according to the fourth embodiment, the link information, the group name, the print flag of the additional drawing object are described in the entire setting area of the job ticket describing the print settings of the print data, the setting area of a logical page unit and the setting area of a physical page unit are provided in the job ticket, and the group name and print flag are described in each setting area. Thus, when an additional drawing objects is added to a document, additional drawing objects to be printed and not to be printed can only be specified only by rewriting the print flag for the entire setting area. Furthermore, the arrangement target area of the additional drawing object can be set in a logical page unit or a physical page unit. Additionally, independent of the print settings of the additional drawing object for the entire document in a physical page unit and logical page unit, whether or not the additional drawing object is to be printed in a physical page and a logical page as an exceptional setting can be set. Thus, the description in the job ticket easily realizes the arrangement of the additional drawing objects on a logical page and a physical page without directly adding an additional drawing object to a document, and the printability in the physical page unit and in the logical page unit can be switched independent of the printability of the additional drawing object for the entire document, thereby allowing a user to more flexibly represent additional drawing objects.

The object of the present invention can be obviously attained by providing a system or an apparatus with a storage medium storing a program code of the software for realizing the function of a host and terminals according to the first to fourth embodiments, and the computer (or CPU or MPU) of the system or the apparatus reading and executing the program stored in the storage medium.

In this case, the program code itself read from the storage medium realizes the function according to the first to fourth embodiment, and the storage medium storing the program code and the program code configure the present invention.

As a storage medium for providing a program code can be used ROM, a flexible disk, a hard disk, an optical disk, a magneto-optical disk, CD-ROM, CD-R, a magnetic tape, a non-volatile memory card, etc.

Furthermore, not only the functions of the first to fourth embodiments realized by executing the program code read by the computer, but also the functions of the embodiments realized by a part or all of the actual process performed by the OS, etc. operating in the computer according to the instruction of the program code can be obviously included in the present invention.

Additionally, the present invention also includes the function according to the first to fourth embodiment obtained by a part or all of the actual process performed by the CPU, etc. in the function expansion board and the function expanding unit according to the instruction of the program code which is read from the storage medium is written to the memory of the expanded function board inserted into the computer and the function expansion unit connected to the computer.

Figure 21:
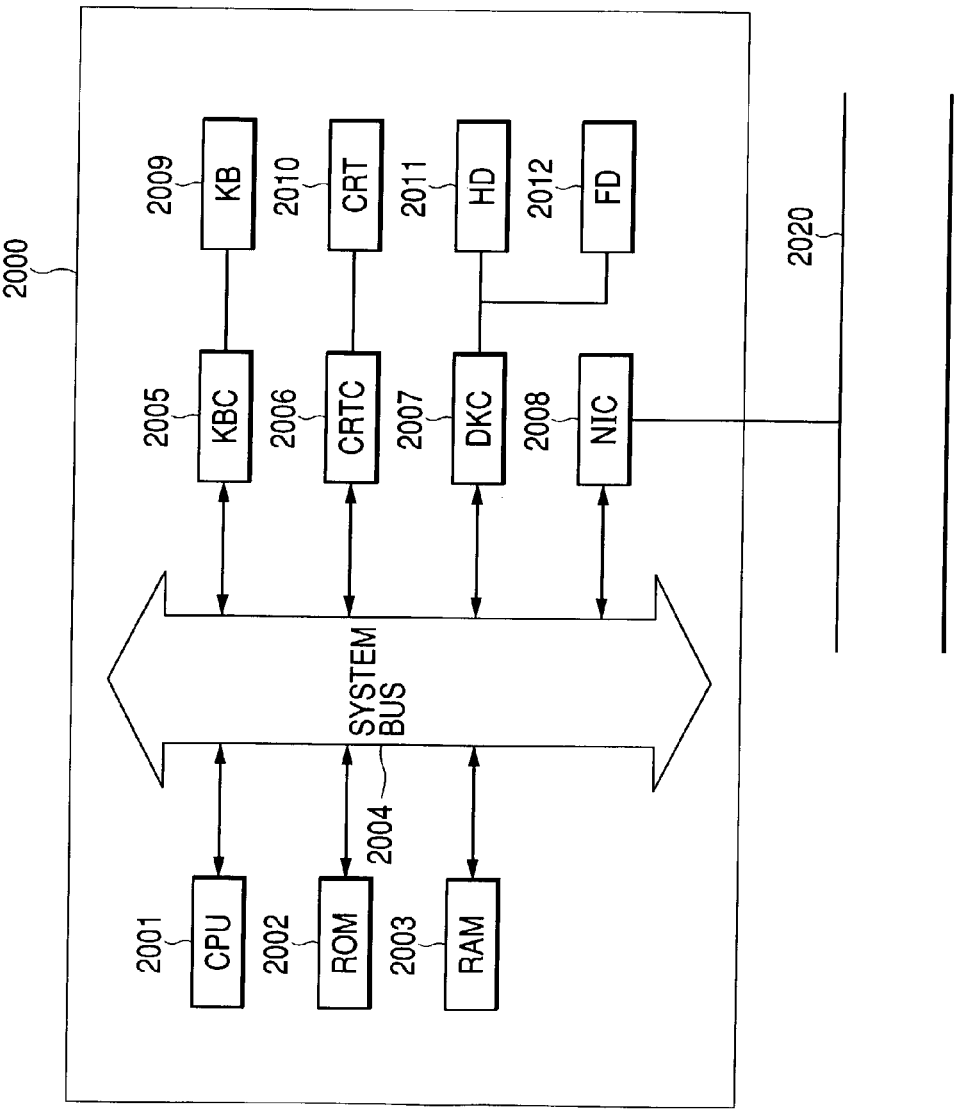
FIG. 21 is a block diagram of the configuration of a computer reading a program used to direct the computer to realize the function of the printing system from a computer-readable storage medium and executing the program.

FIG. 21 shows the function 2000 of the above-mentioned computer.

A computer function 2000 are configured by communicably connecting a CPU 2001, ROM 2002, RAM 2003, a keyboard controller (KBC) 2005 of a keyboard (KB) 2009 CRT controller (CRTC) 2006 of a CRT display (CRT) 2010 as a display unit, a disk controller (DKC) 2007 of a hard disk (HD) 2011 and a flexible disk (FD) 2012 and a network interface controller (NIC) 2008 for connection to a network 2020 through a system bus 2004 as shown in FIG. 21.

The CPU 2001 totally controls each component connected to the system bus 2004 by executing the software provided by the software stored in the ROM 2002 or the HD 2011 or the FD 2012.

That is, the CPU 2001 controls the realization of the operations according to the first to fourth embodiments by reading the process program in accordance with a predetermined process sequence from the ROM 2002, HD 2011, or FD 2012 for execution.

The RAM 2003 functions as main memory of the CPU 2001, a work area, etc.

The KBC 2005 controls an instruction input from the KB 2009, a pointing device, etc. not shown. The CRTC 2006 controls the display of the CRT 2010.

The DKC 2007 controls the access to the HD 2011 and the FD 2012 storing a boot program, various applications, an editing file, a user file, a network management program, and a predetermined process program according to the present embodiments.

The NIC 2008 bidirectionally communicates with an apparatus or a system on the network 2020.

As many apparently widely different embodiments of the present invention can be made without departing from the spirit and scope thereof, it is to be understood that the invention is not limited to the specific embodiments thereof except as defined in the appended claims.

According to the above-mentioned embodiments of the present invention, the configuration is such that when an additional drawing object is added to the print data of the target page for printout, a job ticket for use in the printout is generated according to the information about the additional drawing object and the instruction information about the printout, and the print data of the target page is output based on the job ticket.

The additional drawing object (added information) in this embodiment can be, for example, data such as an annotation, a watermark, a form overlay, variable data (data for printing for each client in a specific position of printing such as direct mail, etc.).

With the above-mentioned configuration, for example, the following effects (1) to (7) can be obtained.

(1) Since print instruction information and information about an additional drawing object are contained for a job ticket, printing out using the object ticket realizes the printing on the added information (additional drawing object) without changing the original print data.

(2) The print contents can be classified into data with an additional drawing object, data without an additional drawing object, etc. for each distribution target and purpose of the printing.

(3) When a reprinting is performed using print data and print instruction information, added information is not embedded in print data as in the conventional methods. That is, since added information is contained in the object ticket corresponding to print data, only the added information can be edited by updating, changing, correcting, etc. of data.

(4) When editing is performed only on the added information, a printable environment (OS, printer, display, etc.) is not restricted because the added information is not embedded in the print data and the application for performing the embedding process of the added information on the print data is not required. Therefore, for example, an amended print designation can be issued from a mobile phone, etc.

(5) Since added information is not embedded in the print data as in the conventional methods, but the added information is contained in the object ticket corresponding to the print data, when only the print data and the print instruction information are stored, it is not necessary to simultaneously store an application for the embedding process of the added information.

(6) For example, although a large volume of data is contained in the printing of several thousands of pages, the print data of the pages can be easily edited by collective update, change, correction, etc.

(7) The convenience in printing through a network can be improved.

As described above, according to the present invention, an object attribute including the group name of an additional drawing object is described in the entire setting area of the job ticket describing print settings of print data, and the group name is described in a setting area in a predetermined unit, thereby without additionally directly writing the additional drawing object to a document easily realizing the arrangement of the additional drawing object in a predetermined unit for the job ticket.

Furthermore, by describing the object attribute containing a print flag of an additional drawing object in the entire setting area of the job ticket when an additional drawing object is added to a document, whether or not the additional drawing object is to be printed can be collectively set by rewriting the print flag of the entire setting area. The process of setting means for the job ticket is simplified.

Additionally, by describing the object attribute including the group name and a print flag of an additional drawing object in the entire setting area of the job ticket, and by describing the group name and the print flag in the setting area in a predetermined unit, whether or not the additional drawing object is to be printed in a predetermined unit can be set independent of the setting of the additional drawing object for the entire document, there by allowing a user to more freely represent the additional drawing object.

Furthermore, by providing a physical page setting area and a logical page setting area in a setting area in a predetermined unit, and describing the group name of an additional drawing object in each setting area, whether the additional drawing object is arranged on a logical page or a physical page can be easily set.

What is claimed is:

1. An information processing apparatus which adds an additional drawing object to document data, comprising:

a first setting unit adapted to set a first additional drawing object to each of a plurality of pages of the document data;

a second setting unit adapted to set adding a second additional drawing object to each of a plurality of sheet faces on which some of the plurality of pages are arranged;

a first exceptional setting unit adapted to set, partially invalidating the setting executed by said first setting unit;

a second exceptional setting unit adapted to set, partially invalidating the setting executed by said second setting unit; and a generation unit adapted to generate a print job in accordance with the setting executed by said first and second setting units and by said first and second exceptional setting units such that a print material is output which comprises (a) a first sheet face on which a plurality of the first additional drawing objects and a single one of the second additional drawing object are arranged, (b) a second sheet face on which a single one of the second additional drawing object is arranged without the first additional drawing object, and (c) a third sheet face on which a plurality of the first additional drawing objects are arranged without the second additional drawing object.

2. The information processing apparatus according to claim 1, wherein said first exceptional setting unit sets not adding the first additional drawing object to at least one page selected by the user from among the plurality of pages of the document data.

3. The information processing apparatus according to claim 1, wherein said second exceptional setting unit sets not adding the second additional drawing object to at least one sheet face selected by the user from among the plurality of sheet faces on which some of the plurality of pages are arranged.

4. A printing processing method carried out in an information processing apparatus which adds an additional drawing object to document data, comprising the program steps of:

a first setting step of setting adding a first additional drawing object to each of a plurality of pages of the document data;

a second setting step of setting adding a second additional drawing object to each of a plurality of sheet faces on which some of the plurality of pages are arranged;

a first exceptional setting step of setting, partially invalidating the setting executed in said second setting step;

a second exceptional setting step of setting, partially invalidating the setting executed in said second setting step; and a generating step of generating a print job in accordance with the setting executed in said first and second setting steps and in said first and second exceptional setting steps such that a print material is output which comprises (a) a first sheet face on which a plurality of the first additional drawing objects and a single one of the second additional drawing object are arranged, (b) a second sheet face on which a single one of the second additional drawing object is arranged without the first additional drawing object, and (c) a third sheet face on which a plurality of the first additional drawing objects are arranged without the second additional drawing object.

5. The printing process method according to claim 4, wherein said first exceptional setting step sets not adding the first additional drawing object to at least one of the pages and said second exceptional setting step sets not adding the second additional drawing object to at least one page selected by the user from among the plurality of pages of the document data.

6. The printing process method according to claim 4, wherein said second exceptional setting step sets not adding the second additional drawing object to at least one sheet face selected by the user from among the plurality of sheet faces on which some of the plurality of pages are arranged.

7. A computer-readable medium encoded with computer-readable instructions for execution in an information processing apparatus which adds an additional drawing object to document data, comprising the steps of:

setting adding a first additional drawing object to each of a plurality of pages of the document data;

setting adding a second additional drawing object to each of a plurality of sheet faces on which some of the plurality of pages are arranged;

setting partially invalidating the setting executed in said first setting step;

setting partially invalidating the setting executed in said second setting step; and generating a print job in accordance with the setting executed in said first and second setting steps and in said first and second exceptional setting steps such that a print material is output which comprises (a) a first sheet face on which a plurality of the first additional drawing objects and a single one of the second additional drawing object are arranged, (b) a second sheet face on which a single one of the second additional drawing object is arranged without the first additional drawing object, and (c) a third sheet face on which a plurality of the first additional drawing objects are arranged without the second additional drawing object.

8. The computer-readable medium according to claim 7, wherein said first exceptional setting step sets not adding the first additional drawing object to at least one page selected by the user from among the plurality of pages of the document data.

9. The computer-readable medium according to claim 7, wherein said second exceptional setting step sets not adding the second additional drawing object to at least one sheet face selected by the user from among the plurality of sheet faces on which some of the plurality of pages are arranged.

* * * * *